(12) United States Patent
Gounares et al.

(10) Patent No.: US 7,167,585 B2
(45) Date of Patent: Jan. 23, 2007

(54) INTERFACING WITH INK

(75) Inventors: Alexander Gounares, Kirkland, WA (US); Steve Dodge, Sammamish, WA (US); Timothy H. Kannapel, Bellevue, WA (US); Rudolph Balaz, Redmond, WA (US); Subha Bhattacharyay, Bellevue, WA (US); Manoj K. Biswas, Bellevue, WA (US); Robert L. Chambers, Sammamish, WA (US); Bodin Dresevic, Bellevue, WA (US); Stephen A. Fisher, Kenmore, WA (US); Arin J. Goldberg, Woodinville, WA (US); Gregory Hullender, Bellevue, WA (US); Brigette E. Krantz, Redmond, WA (US); Todd A. Torset, Woodinville, WA (US); Jerome J. Turner, Redmond, WA (US); Andrew Silverman, Seattle, WA (US); Shiraz M. Somji, Kenmore, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 11/304,540

(22) Filed: Dec. 16, 2005

(65) Prior Publication Data
US 2006/0093218 A1    May 4, 2006

Related U.S. Application Data

(62) Division of application No. 10/184,108, filed on Jun. 28, 2002.

(60) Provisional application No. 60/379,749, filed on May 14, 2002, provisional application No. 60/379,781, filed on May 14, 2002.

(51) Int. Cl.
*G06K 9/00* (2006.01)

(52) U.S. Cl. .................... 382/187; 345/173; 345/179; 382/186; 382/314

(58) Field of Classification Search ............... 345/173, 345/179; 382/186, 187, 188, 314
See application file for complete search history.

(56) References Cited

U.S. PATENT DOCUMENTS

| 5,125,039 | A | 6/1992 | Hawkins |
| 5,220,649 | A | 6/1993 | Forcier |
| 5,309,555 | A | 5/1994 | Akins et al. |

(Continued)

FOREIGN PATENT DOCUMENTS

| EP | 0 566 293 A2 | 10/1993 |
| EP | 1363232 A2 * | 11/2003 |

OTHER PUBLICATIONS

Flohr: "Newton: Aufbau, Funktion, Programmierung," Newton, 1994, pp. 96-101.

(Continued)

*Primary Examiner*—Gregory Desire
(74) *Attorney, Agent, or Firm*—Banner & Witcoff, Ltd.

(57) ABSTRACT

The present invention relates to interfacing with electronic ink. Ink is stored in a data structure that permits later retrieval by applications. The ink includes stroke information and may include property information. Through various programming interfaces, one may interact with the ink through methods and setting or retrieving properties. Other objects and collections may be used as well in conjunction with the ink objects.

10 Claims, 25 Drawing Sheets

U.S. PATENT DOCUMENTS

| | | | |
|---|---|---|---|
| 5,347,295 A | | 9/1994 | Agulnick et al. |
| 5,367,453 A | | 11/1994 | Capps et al. |
| 5,404,442 A | | 4/1995 | Foster et al. |
| 5,463,696 A | * | 10/1995 | Beernink et al. ........... 382/186 |
| 5,500,937 A | | 3/1996 | Thompson-Rohrlich |
| 5,513,309 A | * | 4/1996 | Meier et al. ................ 715/860 |
| 5,528,743 A | | 6/1996 | Tou et al. |
| 5,534,893 A | | 7/1996 | Hansen, Jr. et al. |
| 5,546,538 A | | 8/1996 | Cobbley et al. |
| 5,548,705 A | | 8/1996 | Moran et al. |
| 5,561,446 A | | 10/1996 | Montlick |
| 5,583,543 A | | 12/1996 | Takahashi et al. |
| 5,596,350 A | * | 1/1997 | Capps et al. ................ 345/173 |
| 5,680,480 A | * | 10/1997 | Beernink et al. ........... 382/187 |
| 5,682,439 A | | 10/1997 | Beernink et al. |
| 5,710,573 A | | 1/1998 | Hung et al. |
| 5,710,831 A | | 1/1998 | Beernink et al. |
| 5,749,070 A | | 5/1998 | Gourdol |
| 5,761,328 A | | 6/1998 | Solberg et al. |
| 5,761,538 A | | 6/1998 | Hull |
| 5,850,480 A | | 12/1998 | Scanlon |
| 5,862,256 A | | 1/1999 | Zetts et al. |
| 5,893,126 A | | 4/1999 | Drews et al. |
| 5,917,493 A | | 6/1999 | Tan et al. |
| 5,953,523 A | | 9/1999 | Martinez et al. |
| 6,000,946 A | | 12/1999 | Snyders et al. |
| 6,002,799 A | | 12/1999 | Sklarew |
| 6,064,766 A | * | 5/2000 | Sklarew ....................... 382/189 |
| 6,088,481 A | | 7/2000 | Okamoto et al. |
| 6,101,280 A | * | 8/2000 | Reynolds ..................... 382/187 |
| 6,128,007 A | | 10/2000 | Seybold |
| 6,282,316 B1 | | 8/2001 | Arai |
| 6,320,601 B1 | | 11/2001 | Takasu et al. |
| 6,355,889 B1 | | 3/2002 | Butcher et al. |
| 6,356,655 B1 | | 3/2002 | Sumikawa et al. |
| 6,389,435 B1 | | 5/2002 | Golovchinsky et al. |
| 6,408,091 B1 | | 6/2002 | Sakaguchi et al. |
| 6,493,464 B1 | | 12/2002 | Hawkins et al. |
| 6,563,494 B1 | | 5/2003 | Eichstaedt et al. |
| 6,565,611 B1 | | 5/2003 | Wilcox et al. |
| 6,584,479 B1 | | 6/2003 | Chang et al. |
| 6,661,409 B1 | | 12/2003 | Demartines et al. |
| 6,741,749 B1 | | 5/2004 | Herbert, Jr. |
| 6,813,396 B1 | | 11/2004 | Hollstrom et al. |
| 6,903,751 B1 | | 6/2005 | Saund et al. |
| 6,909,439 B1 | | 6/2005 | Amro et al. |
| 6,924,791 B1 | | 8/2005 | Nicolas et al. |
| 6,961,029 B1 | | 11/2005 | Canova et al. |
| 7,039,234 B1 | * | 5/2006 | Geidl et al. ................. 382/187 |
| 2002/0095440 A1 | | 7/2002 | Burgess et al. |
| 2002/0136462 A1 | | 9/2002 | Hebert |
| 2003/0215140 A1 | | 11/2003 | Gounares et al. |
| 2006/0093218 A1 | * | 5/2006 | Gounares et al. ........... 382/187 |

OTHER PUBLICATIONS

Walid G. Aref, et al., "On Handling Electronic Ink", ACM Computing Surveys, vol. 27, No. 4, Dec. 1995, pp. 564-567.

David R. Millen, "Pen-Based User Interfaces", AT&T Technical Journal, May/Jun. 1993, pp. 21-27.

Nancy J. Freehafer, "Handwriting Recognition in Office XP", Jul. 30, 2001.

"Photoshop® 6 Complete," 2001, Sybex Inc., pp. 123-153.

* cited by examiner

INTERFACING WITH INK

RELATED APPLICATIONS

This application claims priority to U.S. application Ser. No. 10/184,108 filed Jun. 28, 2002, which claims priority of U.S. Provisional Applications Ser. Nos. 60/379,749 and 60/379,781, both filed on May 14, 2002, all of whose contents and appendices are expressly incorporated herein by reference as to their entireties.

FIELD OF THE INVENTION

Aspects of the present invention are directed generally to interfaces between software applications and/or data structures. More particularly, aspects of the present invention interfaces for exchanging information with electronic ink.

BACKGROUND

Typical computer systems, especially computer systems using graphical user interface (GUI) systems such as Microsoft WINDOWS, are optimized for accepting user input from one or more discrete input devices such as a keyboard for entering text, and a pointing device such as a mouse with one or more buttons for driving the user interface. The ubiquitous keyboard and mouse interface provides for fast creation and modification of documents, spreadsheets, database fields, drawings, photos and the like. However, there is a significant gap in the flexibility provided by the keyboard and mouse interface as compared with the non-computer (i.e., standard) pen and paper. With the standard pen and paper, a user edits a document, writes notes in a margin, and draws pictures and other shapes and the like. In some instances, a user may prefer to use a pen to mark-up a document rather than review the document on-screen because of the ability to freely make notes outside of the confines of the keyboard and mouse interface.

Some computer systems permit a user to draw on a screen. For example, the Microsoft READER application permits one to add electronic ink (also referred to herein as "ink") to a document. The system stores the ink and provides it to a user when requested. Other applications (for example, drawing applications as known in the art are associated with the Palm 3.x and 4.x and PocketPC operating systems) permit the capture and storage of drawings. Also, various drawing applications such as Corel Draw and photo and editing applications such as Photoshop may be used with stylus based input products, such as the Wacom tablet product. These drawings include other properties associated with the ink strokes used to make up the drawings. For instance, line width and color may be stored with the ink. One goal of these systems is to replicate the look and feel of physical ink being applied to a piece of paper. However, physical ink on paper may have significant amounts of information not captured by the electronic collection of a coordinates and connecting line segments. Some of this information may include the thickness of the pen tip used (as seen through the width of the physical ink), the shape of the pen tip, the speed at which the ink was deposited, pressure, angle, and the type of pen tip used, and the like.

Another problem has arisen with electronic ink. It has been considered part of the application in which it is written. This leads to a fundamental inability to provide the richness of electronic ink to other applications or environments. While text may be ported between a variety of application (through use, for example, of a clipboard), ink fails to have this ability of being able to interact with the ink. For example, one could not paste and image of the "8" into a document, then make the ink bold.

SUMMARY

Aspects of the present invention provide a flexible and efficient interface for interacting with properties, invoking methods and/or receiving events related to electronic ink, thereby solving one or more of the problems identified with conventional devices and systems. Some aspects of the present invention relate to improving the content of stored ink. Other aspects relate to modifying stored ink. Still further aspects relate to coordinating the ability for ink data to be rendered together.

These and other features and aspects of the invention will be apparent upon consideration of the following detailed description of the drawings.

BRIEF DESCRIPTION OF THE DRAWINGS

The foregoing summary of the invention, as well as the following detailed description of the drawings, is better understood when read in conjunction with the accompanying drawings, which are included by way of example, and not by way of limitation with regard to the claimed invention.

DETAILED DESCRIPTION OF THE DRAWINGS

Figure 1:
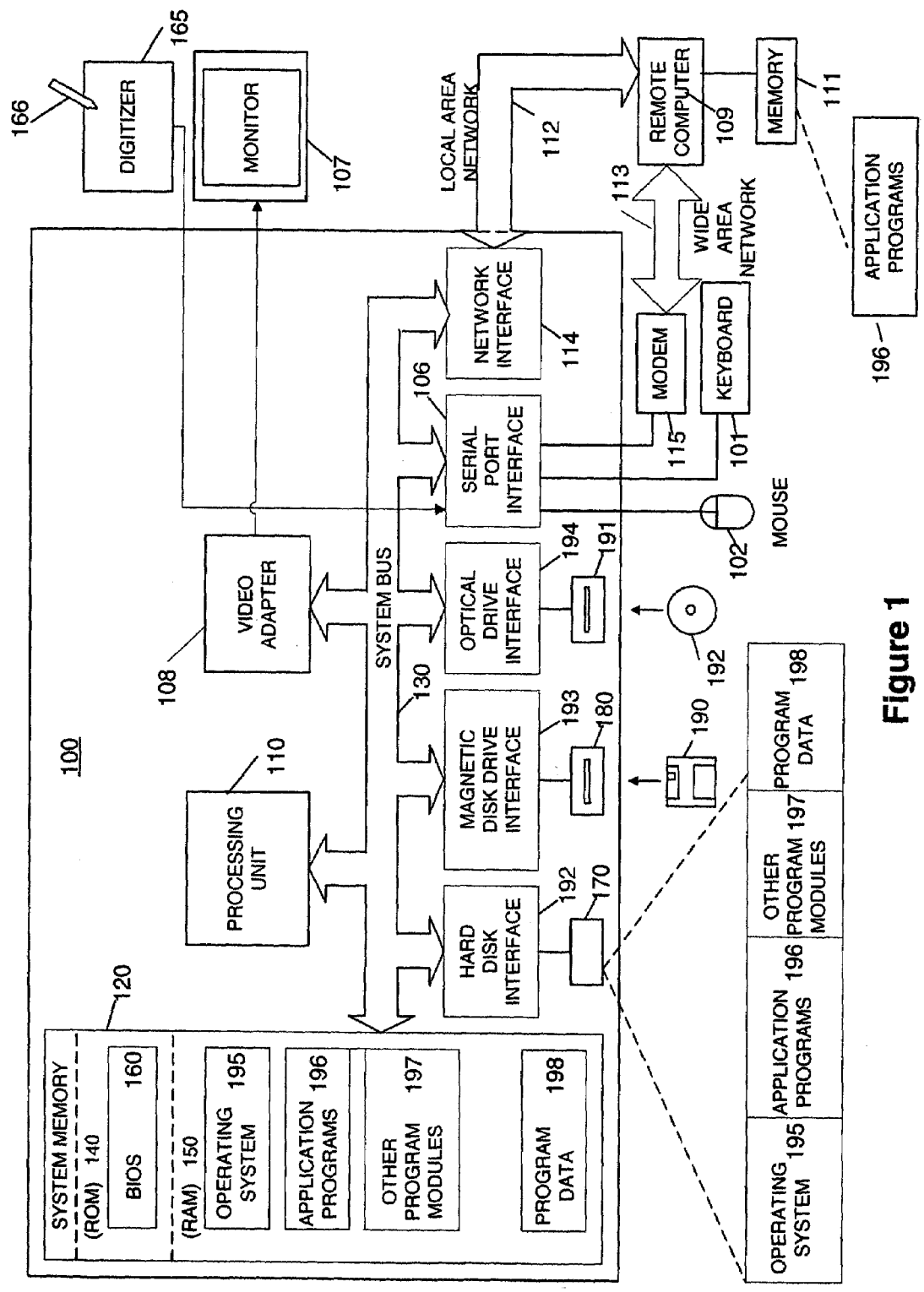
FIG. 1 shows a schematic diagram of a general-purpose digital computing environment that can be used to implement various aspects of the invention.

The following description is divided into sub-sections to assist the reader. The sub-sections include: characteristics and storage of ink; terms; general-purpose computer and associated hardware; an example of strokes of ink; properties, methods, tables, and indices; objects and collections; and a summarization of interfacing with ink.

Characteristics and Storage of Ink

Aspects of the present invention relate to making ink an accessible data form. Aspects include providing application programming interfaces for ink and related parts of ink. Ink as used herein refers to electronic ink. Ink refers to a sequence of strokes, where each stroke is comprised of a sequence of points. The points may be represented using a variety of known techniques including Cartesian coordinates (X, Y), polar coordinates (r,Θ), and other techniques as known in the art.

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve).

To provide the look and feel of physical ink, the electronic ink may be stored as a set of strokes having points. Alternatively, the ink may be stored with or associated with various properties, methods, and events that help further create a richer data type. This meta data exists in addition to, not in place of the points. The ink may be associated with general properties, method, or events, or each ink data structure may have its own properties, methods, or events (and any combination thereof).

Properties of the ink may include, for example, color, width, pressure between the stylus and tablet, and angle between the stylus and tablet, and pen shape and the like. While these properties may suffice for many applications, embodiments of the present invention provide for the extensible storage of custom properties (and other data) generated by applications. All strokes and values may be stored directly with excess information. However, alternative embodiments reflect considerations that eliminate excess information when possible or practicable.

The properties or methods used to define the ink and the strokes within the ink may have varying scope. For example, some properties may apply to all ink strokes in an ink object (e.g., the shape of a pen tip). Other properties may relate only to a specific point (e.g., a point at which a stylus starts a stroke). Others may relate to specific strokes while others may relate to packets of information as reported by hardware (e.g., coordinates, pressure, angle of pen, the intervals of time between reported coordinates, and the like). In short, properties have different levels of scope.

The ink may be referred to as an object. This ink object may include other objects including one or more stroke objects. Further, the stroke objects may be referenced on their own to provide the ability to modify or manipulate collections of strokes directly, as opposed to modifying portions of each ink object in series.

To efficiently store properties or methods, some may be explicitly specified while others may be implicit. The ink object may only have X and Y coordinate values. In another example, the ink object may have properties that affect the entire ink object but the properties are specified in the ink object. In a third example, some strokes may have a first set of properties and others have a second set of properties. The properties may be defined initially at the beginning of the ink object and the individual strokes may reference the previously defined properties as needed. Using this approach of defining properties then later referencing the properties promotes a greater efficiency in storing properties. This becomes more apparent as an ink object becomes larger as the number of properties increases and the number of ink strokes referencing the properties increases.

Terms

Ink—A sequence or set of strokes with properties. A sequence of strokes may include strokes in an ordered form. The sequence may be ordered by the time captured or by where the strokes appear on a page. Other orders are possible. A set of strokes may include sequences of strokes or unordered strokes or any combination thereof. Ink may be expanded to include additional properties, methods, and trigger events and the like. When combined with at least some of these events, it may be referred to as an ink object.

Stream—A sequence of strokes that may or may not include properties that comprises a data structure.

Ink object—A data structure storing a stream with or without properties, methods, and/or events.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

Virtual Ink Space or Ink Space Region—A framework to which all present ink strokes relate. The framework may include a two or three-dimensional shape. In one example, the framework may include a unit size square. In another example, the framework may include a defined region. While some ink strokes may extend outside of the framework, the framework may be used for rendering purposes including dimensioning for a printer or a display. In one aspect, the framework is a norm to which ink strokes may be spatially defined.

Global Ink Properties—These are properties that apply to a stroke or set of strokes in an ink object unless otherwise defined. For example, a global ink color may be blue. By setting all strokes to blue, the color of the strokes captured strokes would be blue.

Local Ink Properties—These are properties that apply to a specific stroke (or data point or data points). For example, while a global ink property may be blue, a specific stroke may be set to red. Some local ink properties may be interpreted, in some cases, as global properties as they affect subsequently encountered strokes in an ink object. It is noted that properties may or may not be labeled as global or local. In some examples, the created data structure defines the scope of the properties.

Render—The process of determining how graphics (and/or ink) is to be displayed, whether on a screen or printed, or output into another data format.

General Purpose Computer

FIG. 1 illustrates a schematic diagram of an illustrative conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port interface 106 is shown, in practice, the pen digitizer 165 may be coupled to the processing unit 110 directly, parallel port or other interface and the system bus 130 as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
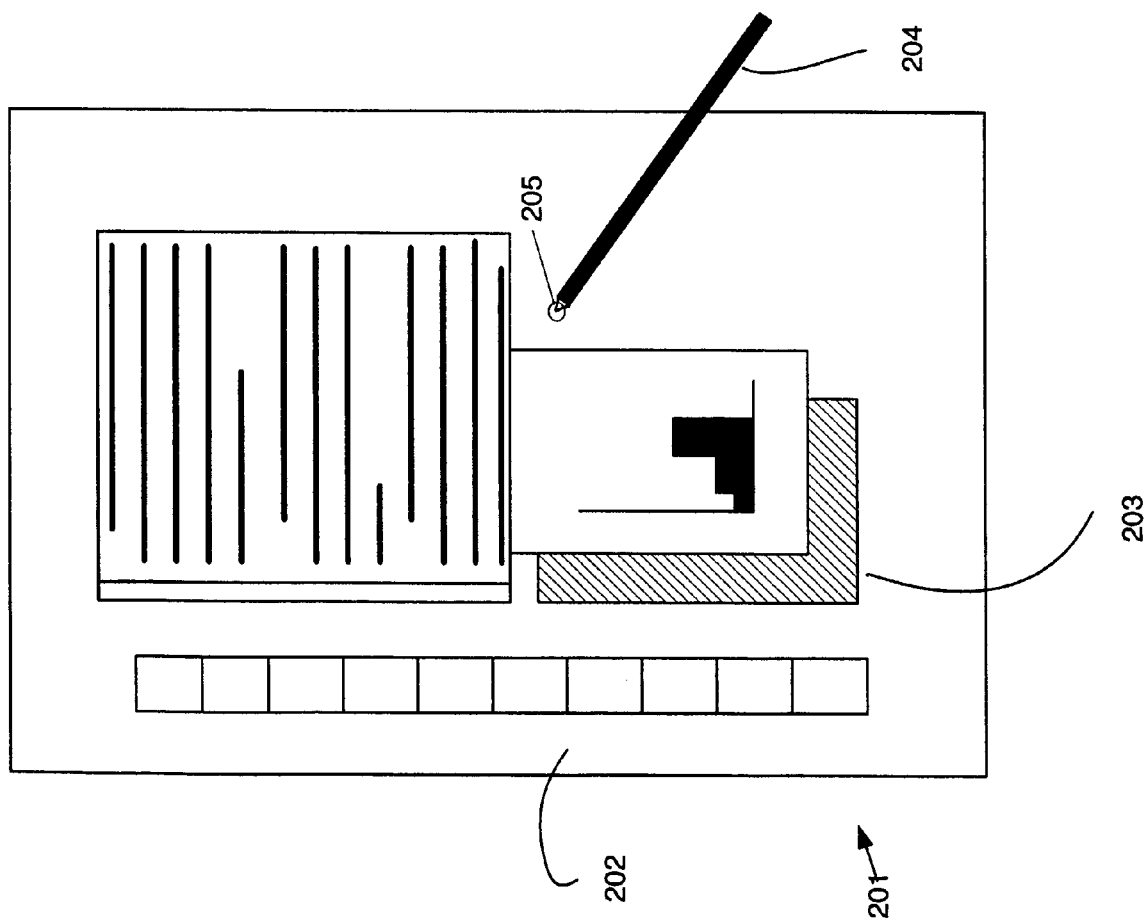
FIG. 2 shows a plan view of a tablet computer and stylus that can be used in accordance with various aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

An Example of Strokes of Ink

Figure 3:
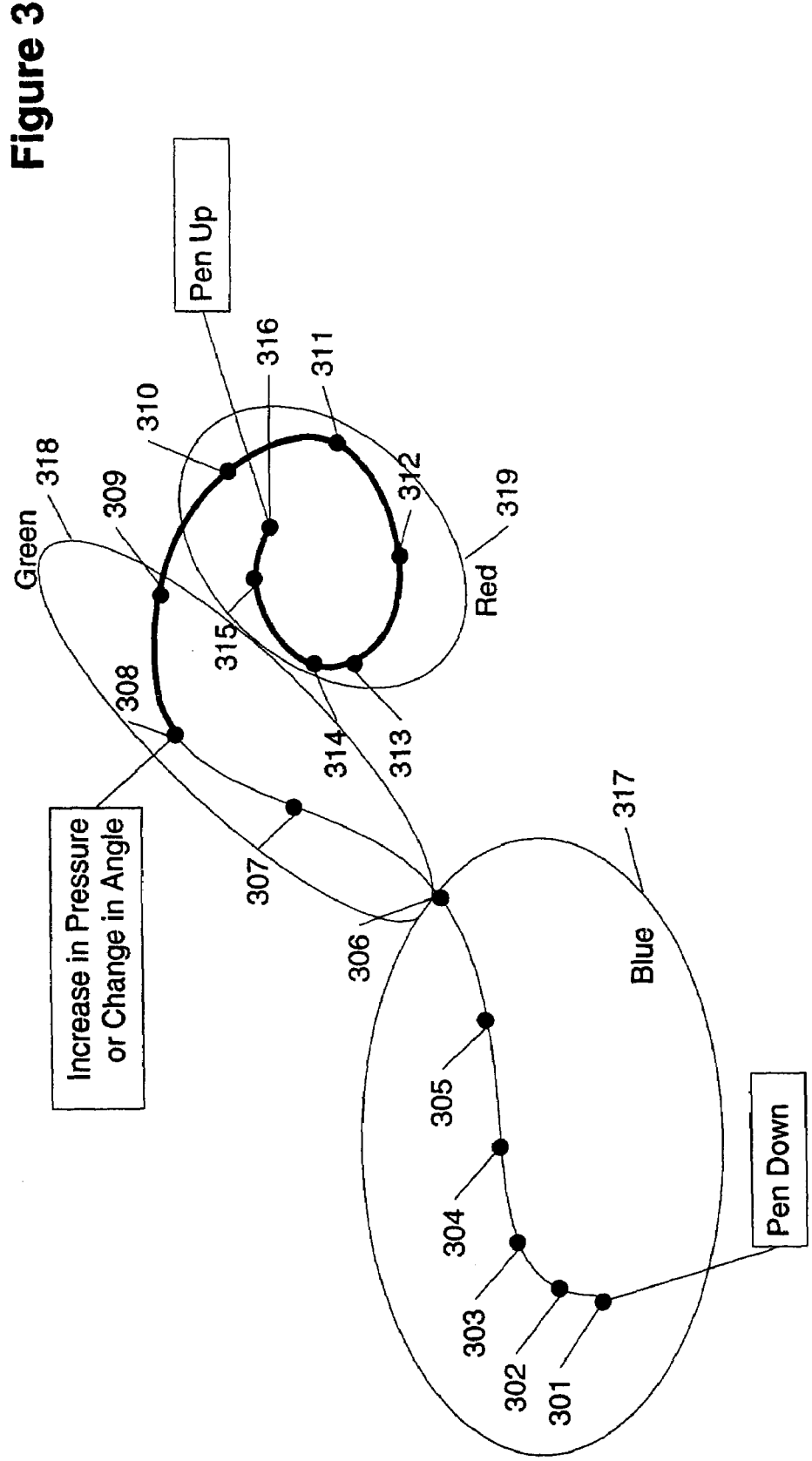
FIG. 3 shows an example of a stroke or strokes of ink having points and properties in accordance with the present invention.

A visual form of an illustrative ink object is shown in FIG. 3. The strokes of the ink object start at point 301 where a pen-down action occurred. The pen-down action may be stylus 204 contacting the display surface 202, the click of a mouse button, the operation of a button on a trackball or joystick, or the like. The user controls an input device (such as stylus 204) and the resulting stroke continues through points 302–316. At point 316, a pen-up action occurred. The pen-up action may be the lifting of the stylus 204 off the display surface 204, releasing or another operation of a mouse button, or the operation of the button (or other buttons) on the trackball or joystick or the like. Here, a pen up action and a pen down action are known in the pen or Stylus-based digitizing art.

From points 301 through 308, the width of the stroke has a first value. At point 308, the width of the stroke changes to a second value. This may have been because the user increased the pressure between the stylus 204 tip and the display surface 202, because the angle between the stylus 204 and the tablet changed, because the stylus 204 was rotated and projected a different cross section of the stylus 204's nib, or the like. The stroke then continues through point 316 with the second stroke width. In an alternate embodiment, a user started the stroke with a first line width and selected a different line width at point 308 to complete the stroke. In a further embodiment, two strokes may form the ink object as shown in FIG. 3. For example, a first stroke may include points 301–308 and a second stroke may include points 308–316.

In a further embodiment, the ink of FIG. 3 may be represented as four or more strokes. Here, the stroke or strokes from points 301 to 306 may be blue (represented by group 317) with the first stroke width, the stroke or strokes from points 306 to 308 may be green (group 318) with the first stroke width, the stroke or strokes from points 308 to 309 may be green (also as part of group 318) with the second stroke width, and strokes or strokes from points 309 to 316 may be red (group 319) with the second stroke width.

Next, the ink object may be stored (or transmitted or displayed or the like). The ink object may be represented as a single stroke with varying line widths and colors or with constant line widths or constant colors. Alternatively, the ink object may be stored as a variety of strokes having a few data points in which each stroke has its own set of properties. Third, the ink object may be stored as short strokes between points. In short, the ink object may represent a stroke or strokes in a variety of forms with the richness of additional properties that define the ink. Further, the ink stroke may include transparency, and tie-aliasing, and raster operations.

Properties, Methods, Tables, and Indices

Figure 4:
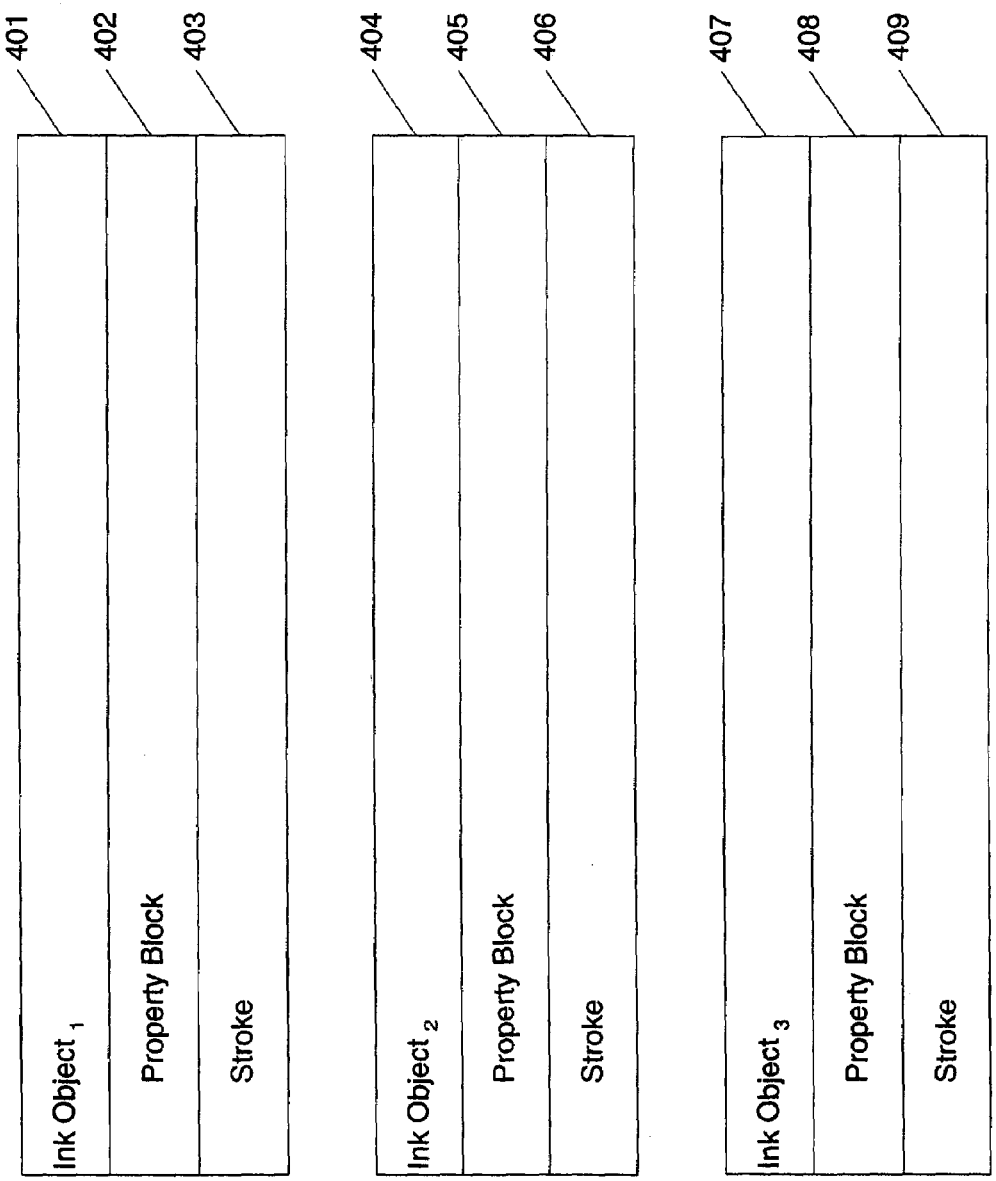
FIGS. 4–7 show various data structures for storing ink and, where relevant, properties associated with ink in accordance with embodiments of the present invention.

The ink object may include a variety of other items. For example, the ink object may include various properties as represented in FIG. 4, where three ink objects $_{1-3}$ 401, 404, and 407 are shown with property blocks 402, 405, and 408 and strokes 403, 406, and 409, respectively. If each property block is different and/or each stroke is not related to the previous strokes, then the representations of the ink objects may each have a minimum possible size. However, if the property blocks 402, 405, and 408 are in at least one way redundant, the separate representations may include redundant information. The property blocks may be the same or may be different. By providing each ink object with its own property block, the ink object is easily transported to other locations or storage mediums without needing to include reference to separately stored general property blocks.

The ink object may have methods associated with it in which the methods may modify the properties or strokes or other information stored within the ink object. The methods may provide information regarding the ink object, the strokes within the ink object, or other information regarding the ink object.

Figure 5:
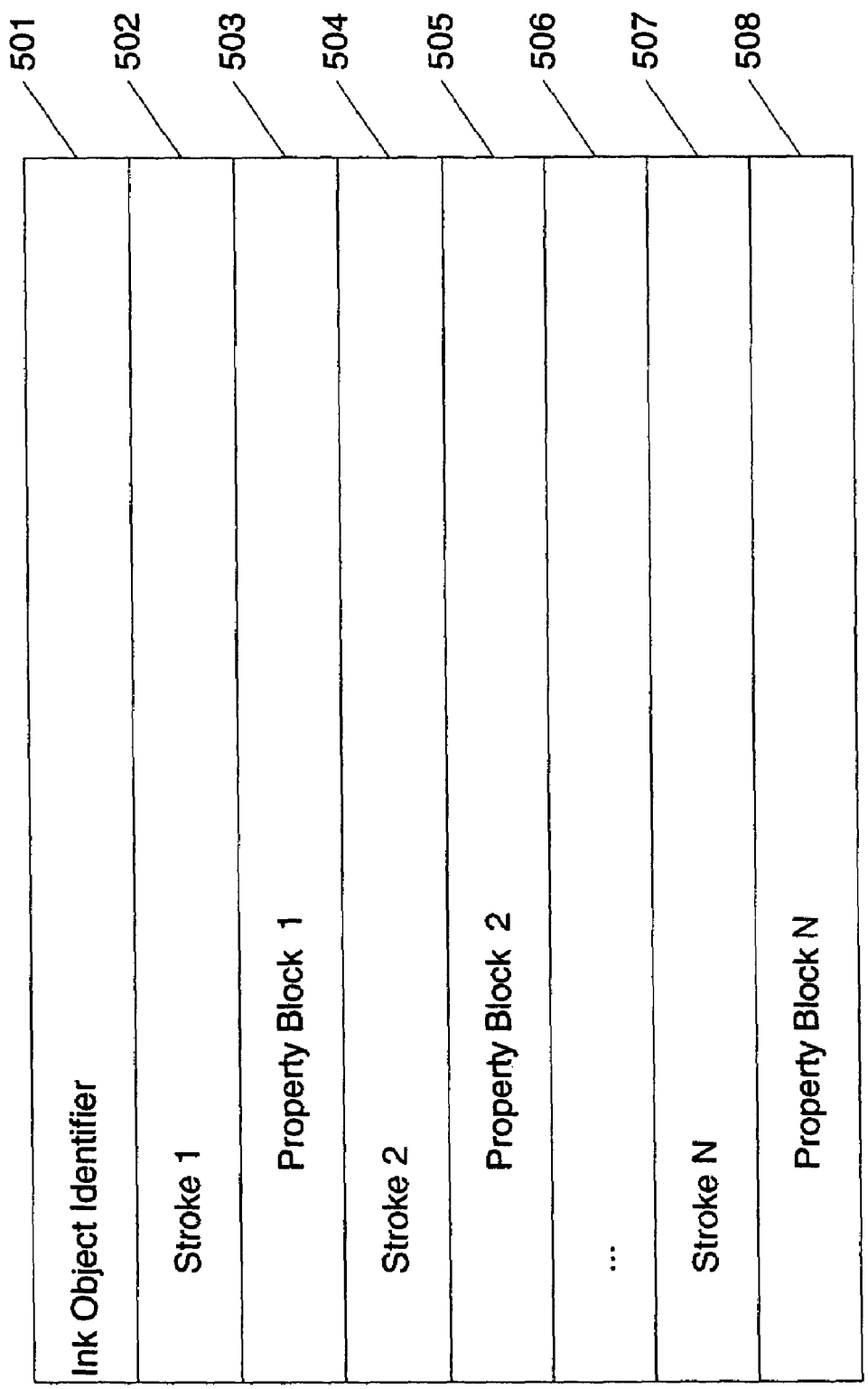
Figure 6:
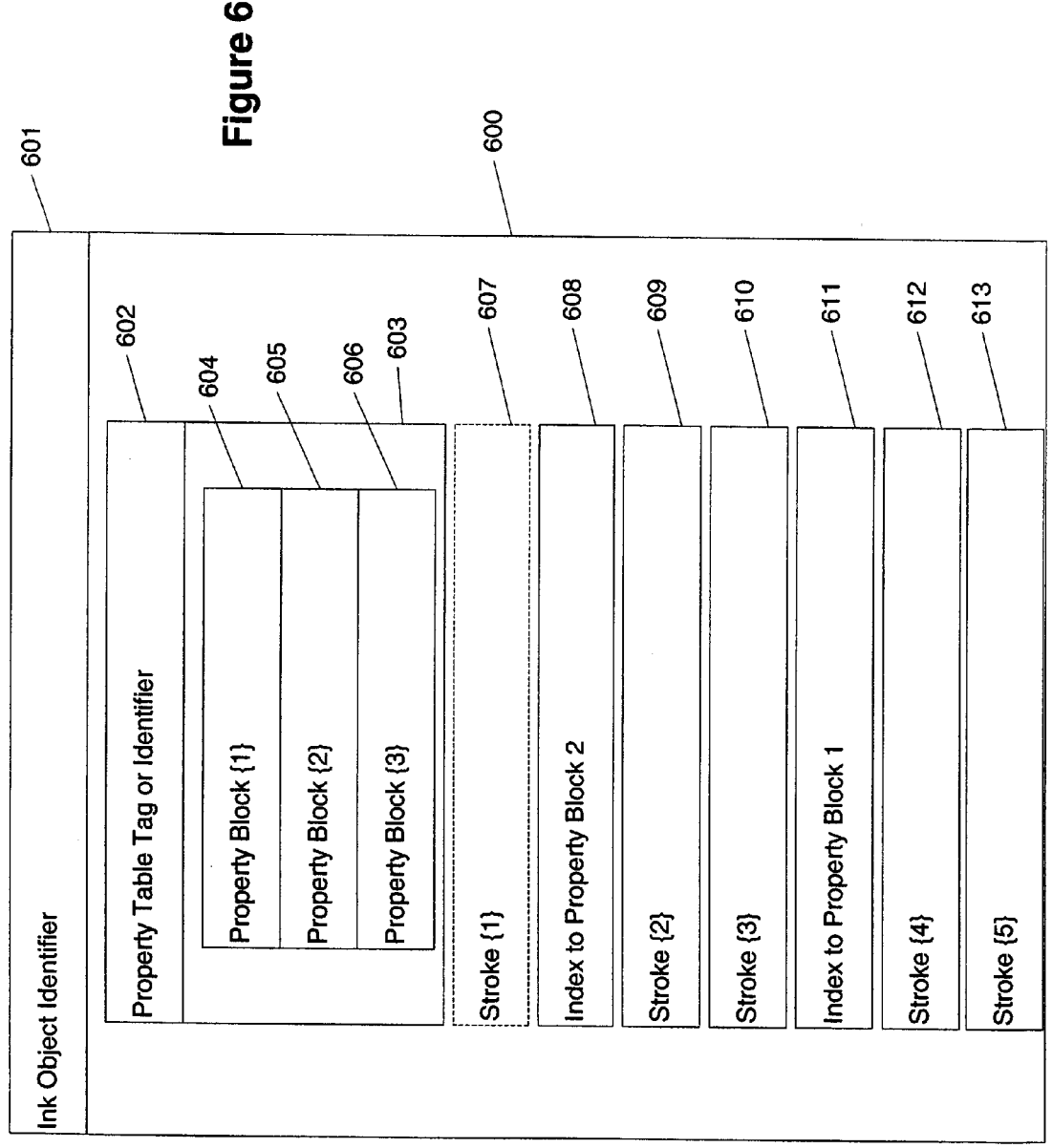

FIG. 6 shows an alternative representation of ink strokes. Here, strokes (502, 504, and 506) have been combined into one ink object. Here, portion 501 is an identifier identifying the ink object as an ink object. The ink object includes stroke 1 502, stroke 2 504, through stroke N 507, with property block 1 503, property block 2, and property bloc N 508 associated with the strokes, respectively. The structure of FIG. 5 provides the advantage over the structure of FIG. 4 in that the ink object identifier 501 is not repeated. This results in a savings of the length of the deleted ink object identifiers in the resulting data structure.

The ink object identifier 501 identifies the following data structure as an ink object. The ink object identifier may also include version information that relates to the version of the software used to write the data structure storing the ink object.

FIG. 6 shows another embodiment of a data structure. Ink object 600 with an ink object identifier 601 contains a property table 603 and five strokes (607, 609, 610, 612, and 613). The property table 603 (with property identifier or tag 602) includes property blocks 604, 605, and 606). The ink object 600 also contains two indices (an index 608 to property block 2 605 and an index 611 to property block 1 604). The two indices are located between strokes 1 607 and 2 609 and between strokes 3 610 and 4 612, respectively. Stroke 1 607 does not have a preceding index. In one example, stroke 1 607 may have properties specified by a default property block (not shown). In another example, stroke 1 607 may have an implicit index to the first property block (here, property block 1 604). In a third example, stroke 1 607 may not appear (rather, pushed down in the data structure to appear after at least one index) as shown by the dotted box of stroke 1 607).

Strokes 3 610 and 5 613 do not have immediately preceding indices. In one example, this may indicate that strokes 3 610 and 5 613 are to have properties specified by the default property block (not shows). In an alternate example, the strokes 3 610 and 5 613 use the most recent preceding index. Stroke 3 610 would use index 608. Stroke 5 613 would use index 611. Eliminating the recitation of an index for strokes 3 610 and 5 613 helps reduce the size of the ink object by the space that would have been consumed by separate indices for strokes 3 610 and 5 613.

Figure 7:
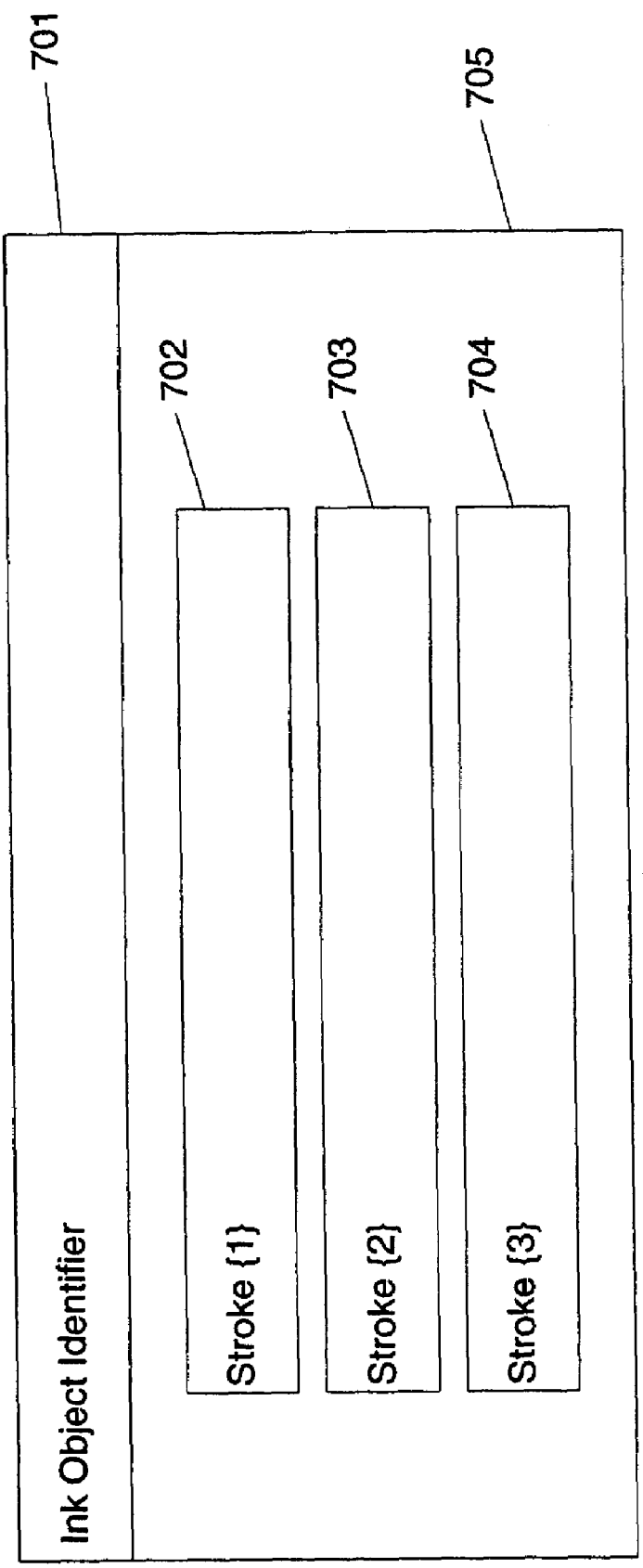

FIG. 7 shows another illustrative embodiment of a data structure. The data structure includes an identifier 701 and three strokes 1–3 702–704. Here, the strokes all use the default properties. The default properties may be specified in a memory, in a separately stored data structure or other locations as known in the art.

Figure 9:
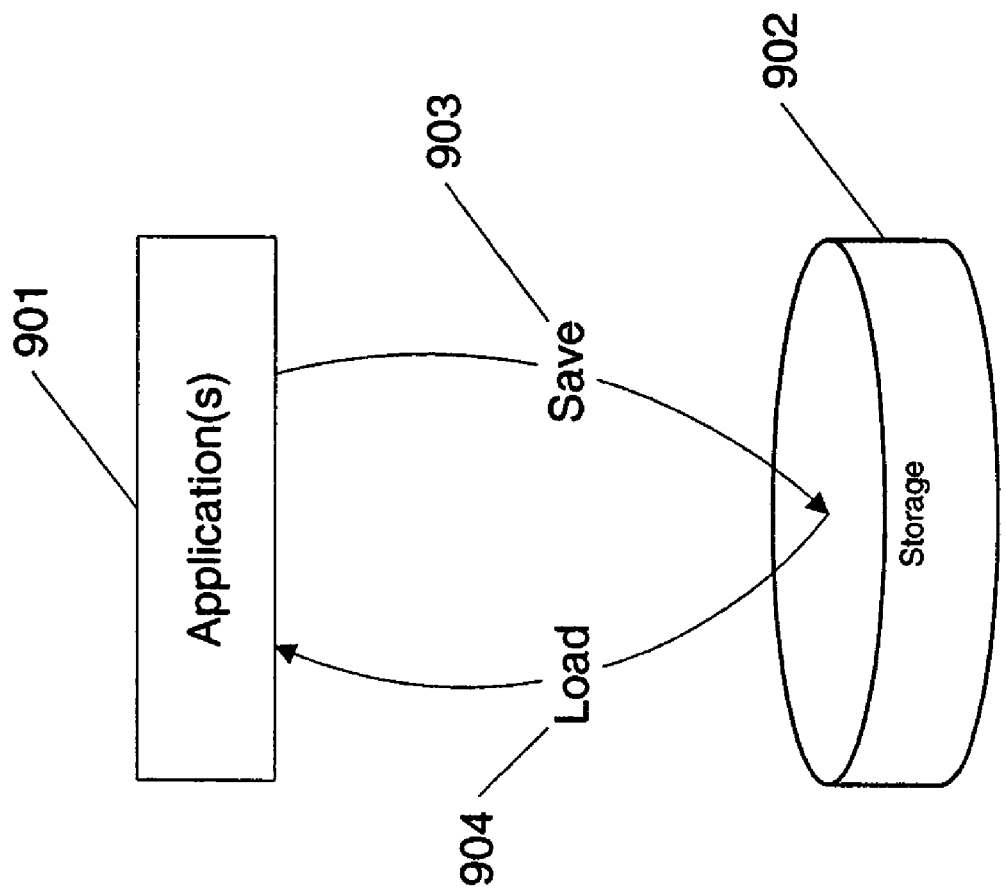
FIG. 9 shows an example of load and save methods in accordance with embodiments of the present invention.

Various methods may exist for the various objects. For example, methods that may be used with an ink object or any other object may include the ability to save ink or load ink from storage. FIG. 9 shows the ink being saved (in this example, by an application 901) in step 903 to storage 902. The ink may be loaded into this or a different application by a load method 904.

Ink properties may be defined to minimize or eliminate redundant information. In simple streams, there may be no ink properties. A number of global properties may be used. More or less global properties may be defined and used as needed.

With respect to ink objects, common properties between ink objects may appear. The properties may be grouped into various groups including, but not limited to, transformation properties, drawing attributes properties, metrics properties, and stroke description properties. Other properties may be defined and used as well. Also, not all (if any) of the specific above-identified properties are required.

Transformation Properties

Ink objects may be created with a number of different input sources. The input sources may include a variety of tablets with different tablet resolutions. The different tablet resolutions may result in ink drawn on a screen be rendered incorrectly when the created ink is ported to and displayed on a tablet having a different resolution or screen size. To adjust the ink to a common size, a set of transform properties (or transforms) may be stored to indicate how the ink object is to be adjusted to a common size.

Strokes are creatures of their input device. The quality and size of ink strokes may vary depending on the resolution and size of digitizer 165. Because of varying zoom levels during the creation of ink strokes, rendering all strokes based on the original points from the digitizer may not accurately reflect what a user intended. Accordingly, one of the properties of the ink object, stroke object, or any collection of ink objects or stroke objects, may include a transform of the strokes in the ink object, the strokes in a stroke object or the strokes in a collection of strokes to the ink space.

Figure 8:
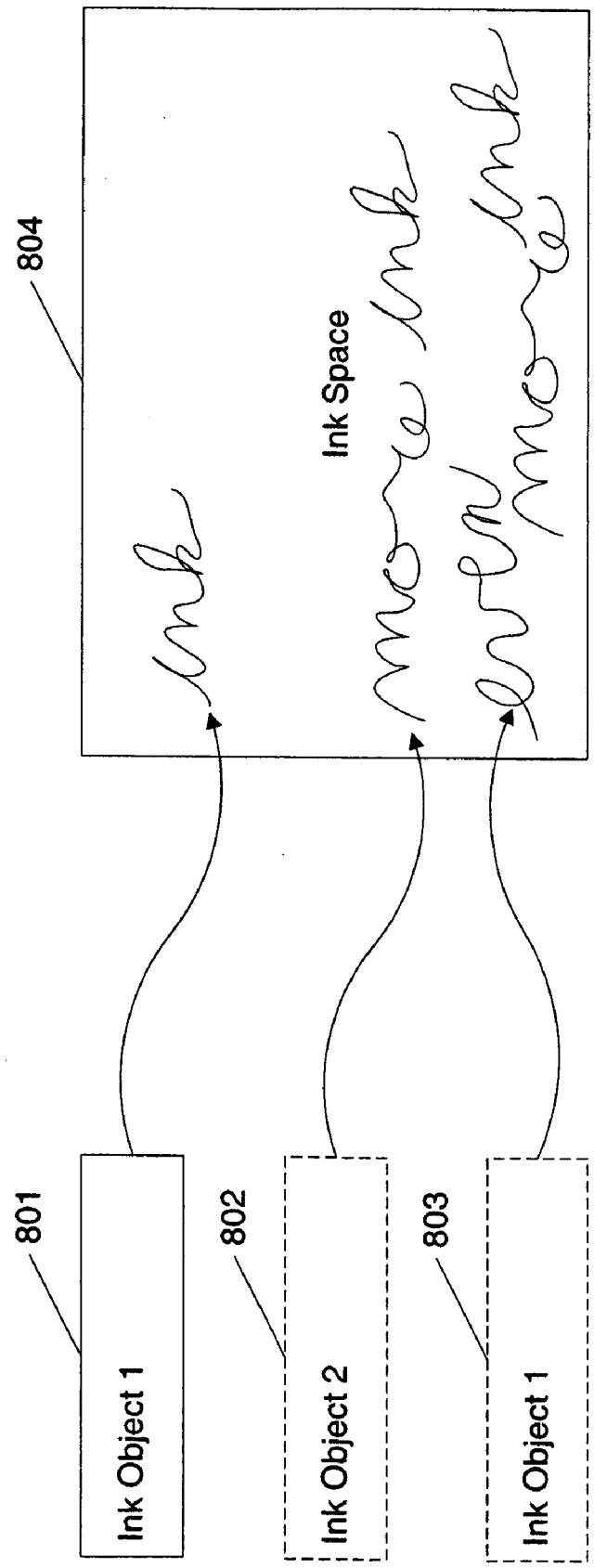
FIG. 8 shows an example of an ink space in accordance with embodiments of the present invention.

FIG. 8 shows an ink object 801 with its associated ink strokes (forming the word "ink") in the ink space region 804. Another ink object 802 is shown with its associated ink strokes (forming the words "more ink") on the ink space region. Finally, ink object 803 shows ink strokes (forming the words "even more ink") starting at a position different from the other two sets of strokes in ink objects 801 and 802. The ink points that are stored in the ink object may represent the points corresponding to the strokes in ink space region 804 or may represent a different coordinate system with a mapping to the ink space region. Ink space may be referred to as a 2-dimensional universe in which strokes exist in a coordinate space. For purposes of simplicity, ink space is referred to as an ink space rectangle, but may take on any shape.

As described above, ink may be captured in a variety of ways. The ink may be made larger or smaller, rotated, translated, warped, cropped, and the like.

Drawing Attributes Properties

The drawing attributes table may list all drawing attribute sets of properties in the stream. Each drawing attribute block defines information used while rendering the ink. These blocks may apply to one or more strokes and may be placed in the drawing attributes table so that they are not repeated in each stroke.

Metrics Properties

The metric table lists metric blocks in the stream. These blocks may apply to one or more strokes and may be placed in this table so that they are not repeated in each stroke.

A metric block fosters a relationship between logical values specified by a stroke descriptor property (defined below) and some real physical characteristics. The most common values include minimum value, maximum value, precision, and/or units. For example, it may not be known implicitly whether pressure is in pounds, Pascal's or kilograms, or an angle with a value of 10 is in degrees or radians. Without further information an application may assume these values are in the standard normalized form, as defined by the ink object system. This assumption may be error prone. Accordingly, the metric block provides a relationship between values of a stroke and how those values relate to the physical device with which the ink was created.

Typically all strokes in an ink stream will use the same metrics block. An ink stream may have several stroke descriptors, yet still only have one metric block. However, the present system may allow different strokes to refer to different metric blocks in the metric table.

The metric block does not necessarily need to define all the packet property tags that are used in the stroke descriptor, since the application may not care about the metrics associated with all the properties or the device may not provide metrics for all the properties. In order to permit the metric block to be easily read in conjunction with the stroke descriptor, the entries in the metric block should be in the same order as found in the stroke descriptor. The metric block differs from the stroke descriptor since it may contain data for X and Y values (for example, identified with TAG_X and TAG_Y). This is because X and Y values may have metrics that need to be stored.

Stroke Descriptor Properties

A stroke may contain arrays of data where each array element corresponds to a property of a point. An application may attempt to store other properties, such as pressure. An application may simply create a custom stroke property (described later) to store pressure. Some applications may not know how to interpret this data and the tag and size of the custom property. In this event, the stroke descriptor block may be used to solve this problem by defining the data types and their order in the stroke. The system may then use an index to associate a stroke with a particular stroke descriptor block.

Typically, all strokes in an ink stream will use the same stroke descriptor block. However, a stroke descriptor table that contains only one block is rare. However, the system allows different strokes to contain different sets of data by placing the blocks in a table.

Objects and Collections

Figure 10:
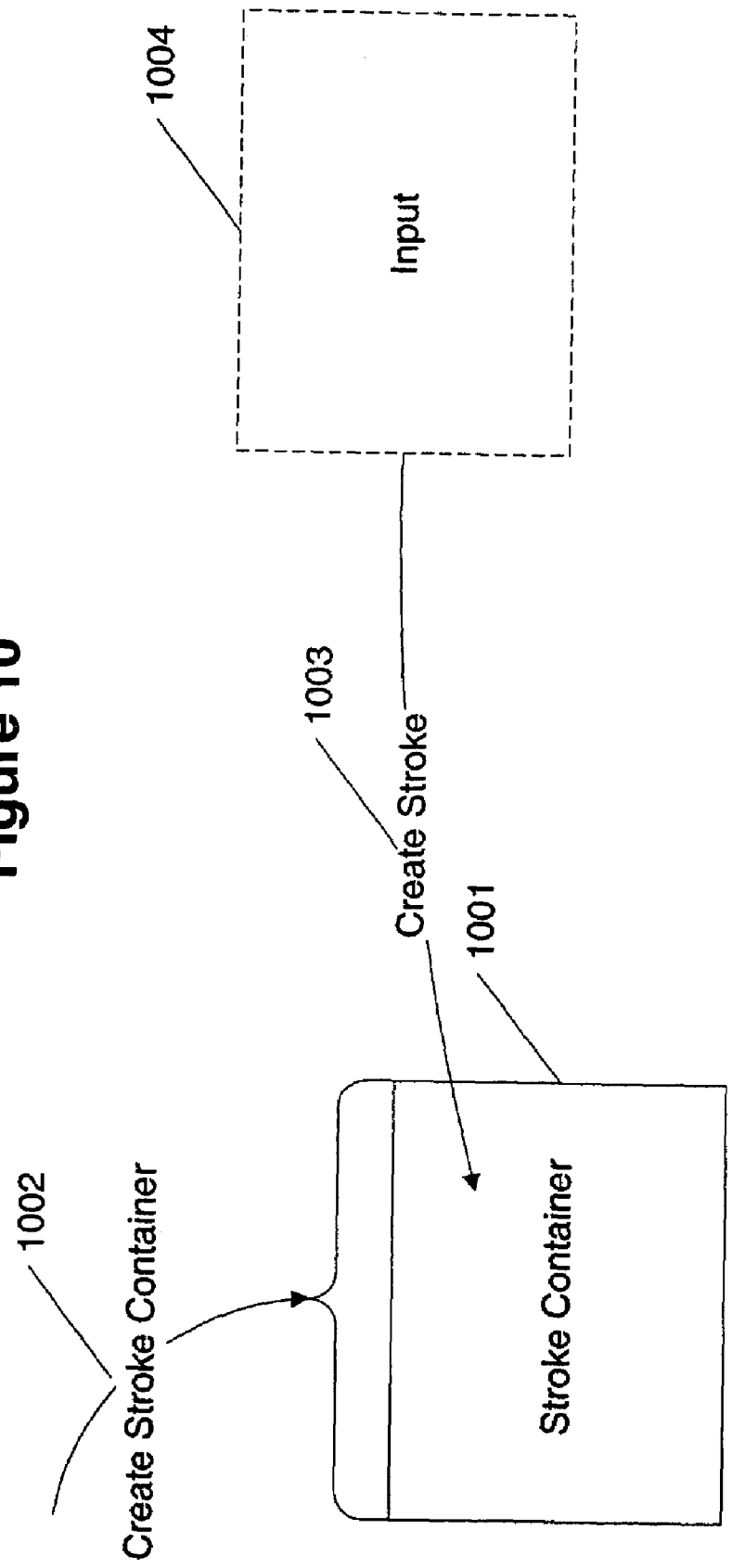
FIG. 10 shows an example of stroke container operations in accordance with embodiments of the present invention.

Referring to FIGS. 3–7, ink objects may contain strokes. They may contain other information as well as including properties. Stroke containers may also contain strokes. Stroke containers may be separately storable objects or may only exist based on instantiated ink objects. Two methods regarding stroke containers are shown in FIG. 10. First, a stroke container 1001 may be created by a create stroke container method 1002. Also, the CreateStroke method 1003 includes information from an input 1004 (for example, digitizer 165 or a data file or other input). The stroke container 1001 may retain the stroke or strokes it contains or may later input the strokes into one or more ink objects.

Figure 11:
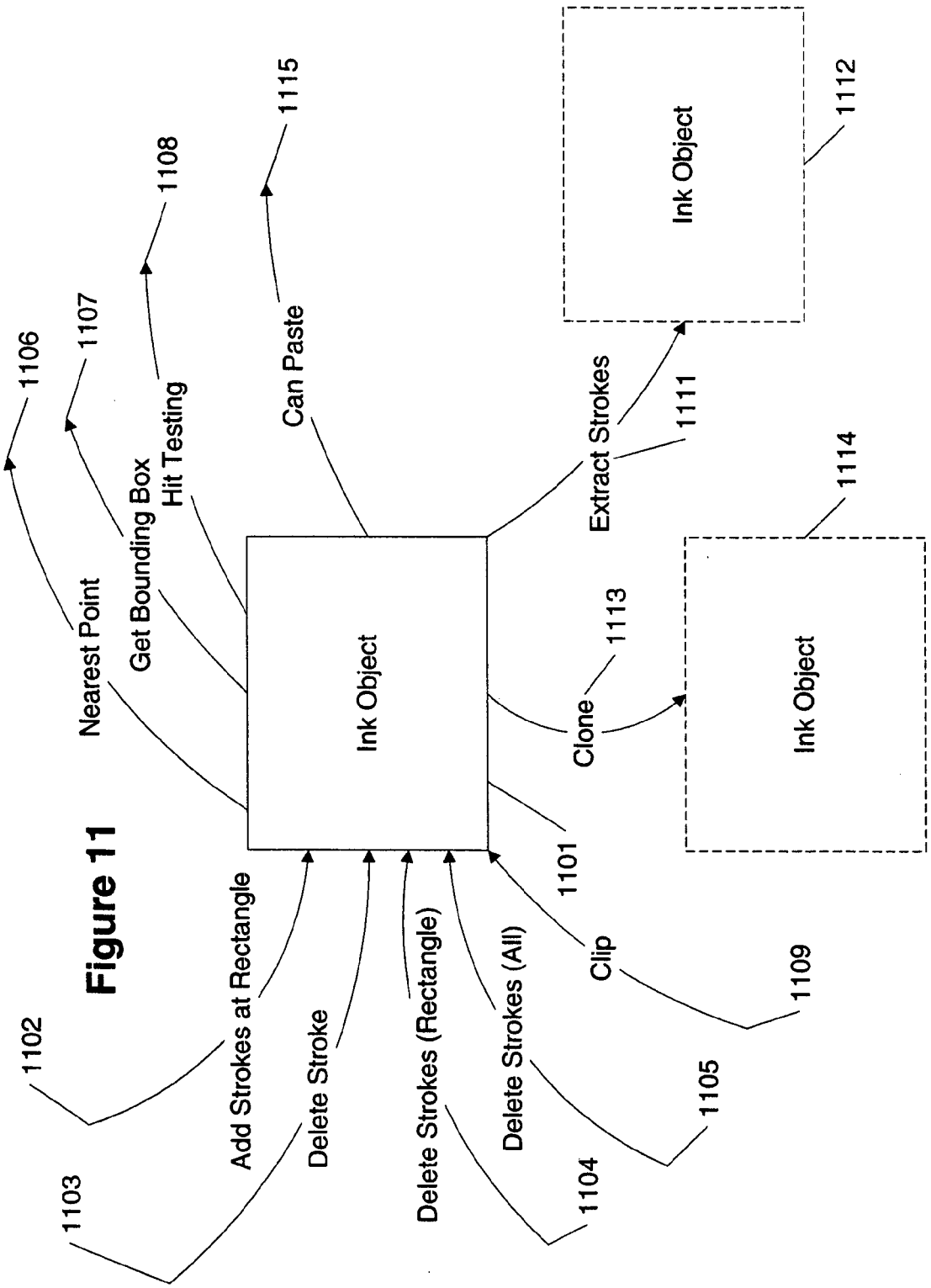
FIG. 11 shows an example of an ink object with methods in accordance with embodiments of the present invention.

FIG. 11 relates to the various methods that may be used in conjunction with ink objects only These methods are used for illustrative purposes only. Other methods may be used in conjunction with these methods or may be used in place of these methods. The various methods may be grouped as methods 1102–1105 and 1109 that modify information in the ink object 1101, methods 1111 and 1113 that obtain strokes from the ink object 1101, and methods 1106–1108 and 1115 that obtain information other than strokes themselves from the ink object 1101. It is appreciated that a number of these methods (and methods described in this document) may be combined.

Strokes may be added to the ink object with method 1102 in which stroke identifiers may be passed to the ink object. Also, the method 1102 may include a rectangle at which the strokes are to be added or the points of the strokes may represent a position in the ink space rectangle to coordinate where the strokes relate to the ink space rectangle. Again, ink space is referred to as a rectangle, but may be any other shape.

Strokes may be deleted from the ink object through methods 1103–1105. The strokes may be deleted by specifying the stroke (method 1103), specifying the rectangle (other shape) encountering or containing strokes 1104, or specifying to delete all strokes in the ink object 1101. On some operations, for example deleting a stroke or strokes, the strokes may be renumbered so as to provide a contiguous listing of strokes.

Strokes in the ink object 1101 may be clipped to a rectangle 1109. Here, any stroke, strokes, or portions of strokes not contained within the rectangle are removed. This may lead to the creation of new points for the clipped strokes at the intersection of the strokes and the rectangle.

Strokes may be obtained from the ink object 1101 through a variety of methods including cloning 1113 the ink object 1101 (resulting in a new ink object 1114) or by extracting strokes themselves 1111 and putting the strokes in an ink object 1112.

Information may be obtained from the ink object 1101 as well. The nearest point of an ink object may be obtained in method 1106 to a provided point. The returned information may include the distance to the point, the identity of the stroke containing the nearest point, the location on the stroke of the nearest point, and other relevant information. The bounding box surrounding all strokes may be obtained in method 1107. The ink object can be queried whether it can paste information to the clipboard 1115. Finally, the strokes in the ink object 1101 may be examined 1108 to determine if a specified region contacts or contains the stroke or strokes. The region may be a circle (for example, a circle with a center point and a radius), a rectangle (with end points), or a complex shape determined by encircling the stroke or strokes with a complex polygon. These regions are described for illustrative purposes. It is appreciated that any shape or combination of shapes may be used.

Figure 12:
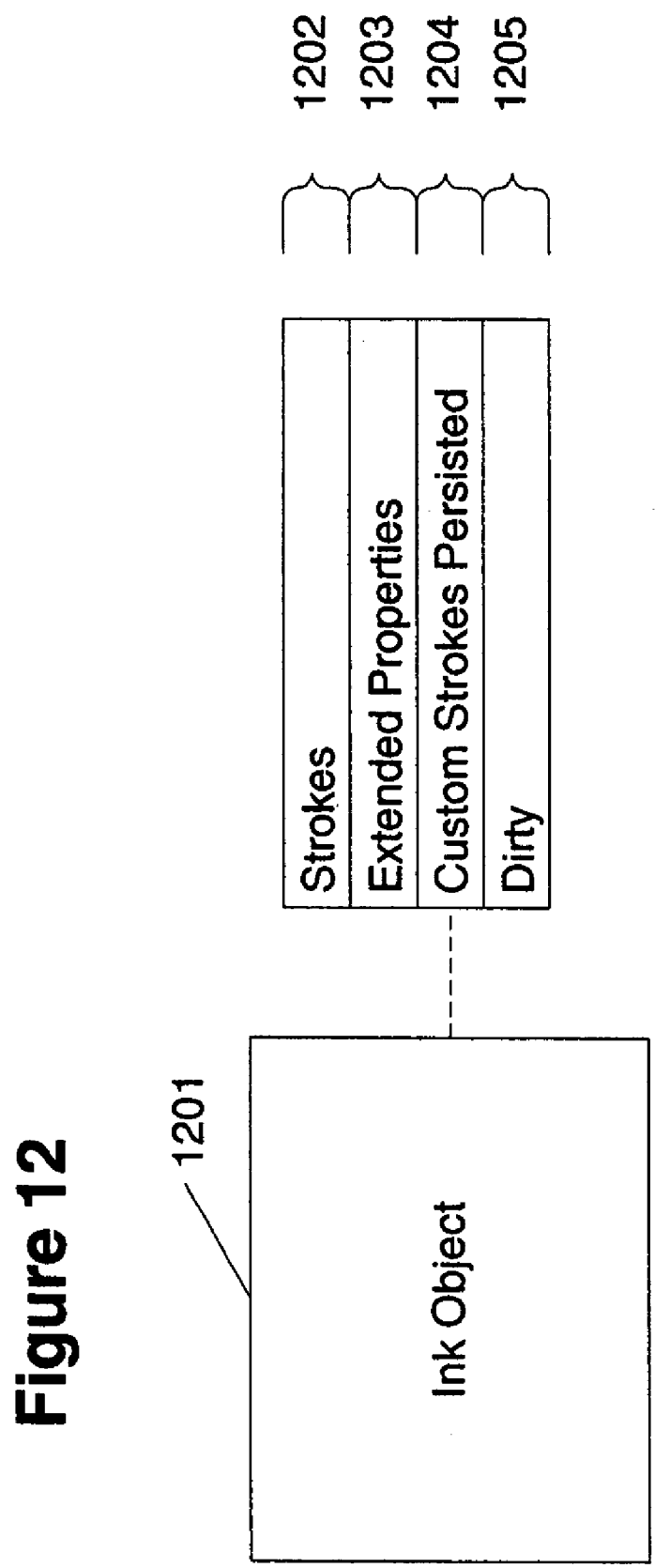
FIG. 12 shows an example of an ink object with properties in accordance with embodiments of the present invention.

FIG. 12 shows a number of properties that may be associated with an ink object. The properties include the strokes 1202 for the ink object. Custom strokes for an application may be set as well in 1204. Properties for the stroke that are specific to an application may also be applied to one or more strokes in the ink object in 1203. Finally, a flag may be set for the strokes (here Dirty) 1205 that indicates whether the strokes were modified since the last time they were saved (for example, to storage 902.

At least two types of ink objects may be defined. A tInk object (the "t" meaning "text") may be embodied as an OLE object representing ink that is expected to form letters or words. The tInk object allows the handwritten ink to be converted to text, such as by a text recognizer. The tInk object may be referred to as an ink object that relates to ink and having a textual context. The color and/or font size of the textual ink, as well as whether the textual ink should be underlined, bold, italic, and/or the like may be set programmatically and may be based on the attributes of the text around the tInk object. In other words, the ambient properties at the tInk object's intended insertion point may be applied to the tInk object. In one embodiment, the tInk object contains only a single word for submission to the text recognizer, such that a sentence may contain multiple tInk objects. On the other hand, an sInk object (the "s" meaning "sketch") may also be defined as an object representing ink that is not expected to form words. The sInk object may also be an OLE object. An sInk object may therefore be interpreted as a drawing or any other non-textual context. A sink object may also be useful for representing multiple words. An ink-compatible application (and/or the user) may mark certain Ink objects as tInk objects and others as sInk objects. For the purposes of description, the two types of ink are described herein as "tInk" and "sInk." It is appreciated, however, that other names may be used to represent the various types of ink object that may be used. In addition, alternative types of objects may be used to store electronic ink in any desired format.

An object (called herein an "InkCollector" object) may be defined and used to capture ink from an ink input device and/or deliver ink to an application. The InkCollector object acts, in a sense, as a faucet that "pours" ink into one or more different and /or distinct ink objects by collecting the ink as one or more ink strokes and storing the ink in one or more associated ink objects. The InkCollector object may attach itself to a known application window. It then may provide real-time inking on that window by using any or all available tablet devices (which may include the stylus 204 and/or a mouse). The ink may be collected as one or more ink strokes and stored in one or more associated ink objects. To use the InkCollector object, the developer may create it, assign which window to collect drawn ink in, and enable the object. After the InkCollector object is enabled, it may be set to collect ink in a variety of ink collection modes, in which ink strokes and/or gestures are collected. A gesture is a movement or other action of the stylus 204 that is interpreted not as rendered ink but as a request or command to perform some action or function. For example, a particular gesture may be performed for the purpose of selecting ink, while another gesture may be for the purpose of italicizing ink. For every movement of a stylus upon or proximate to the digitizer input, the InkCollector object will collect a stroke and/or a gesture.

Figure 13:
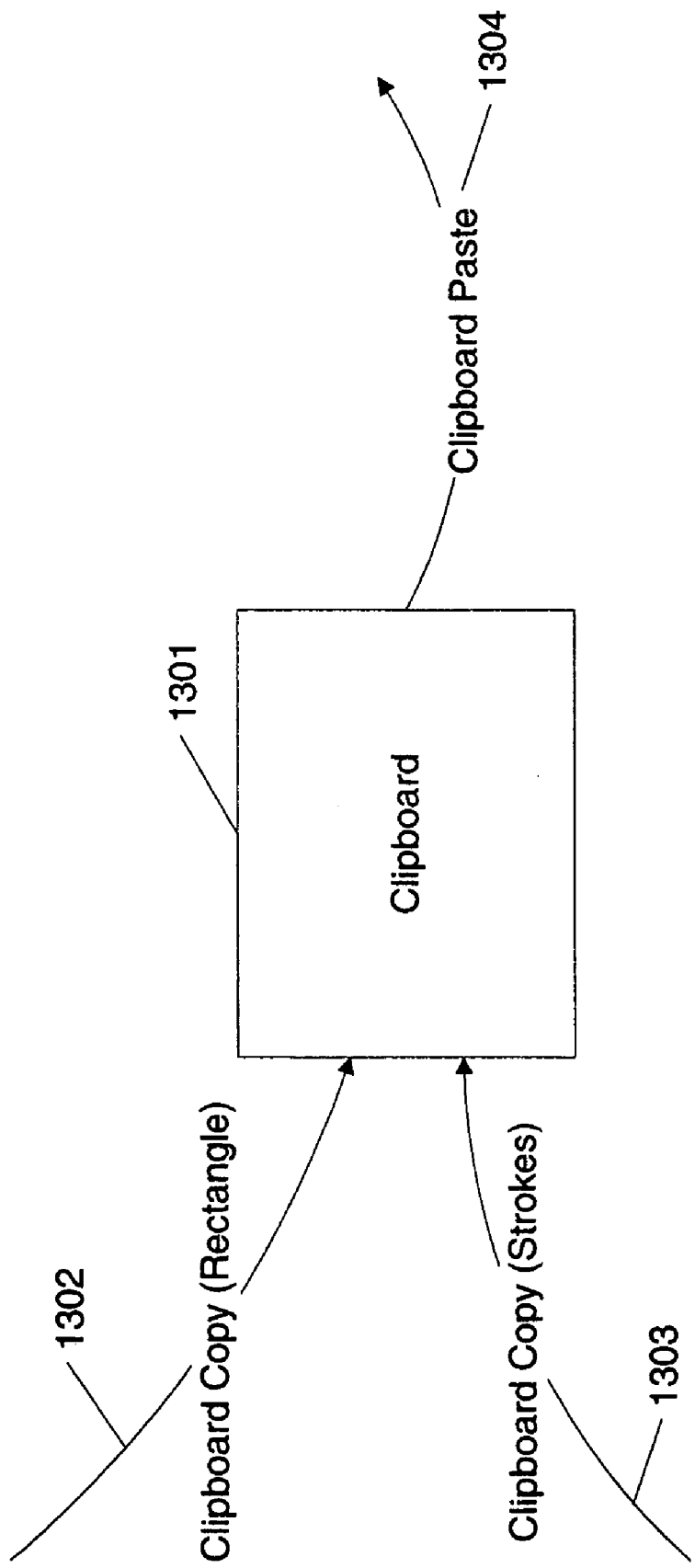
FIG. 13 shows an example of clipboard operations in accordance with embodiments of the present invention.

FIG. 13 shows various operations that a stroke may have with respect to the clipboard. The strokes may be copied to a clipboard or pasted from a clipboard. The strokes may be specified by strokes contained with in or contacted by the space within a rectangle (1302) or may be individually specified in 1303. The paste operation is shown in 1304 of ink strokes being pasted from the clipboard.

Figure 14:
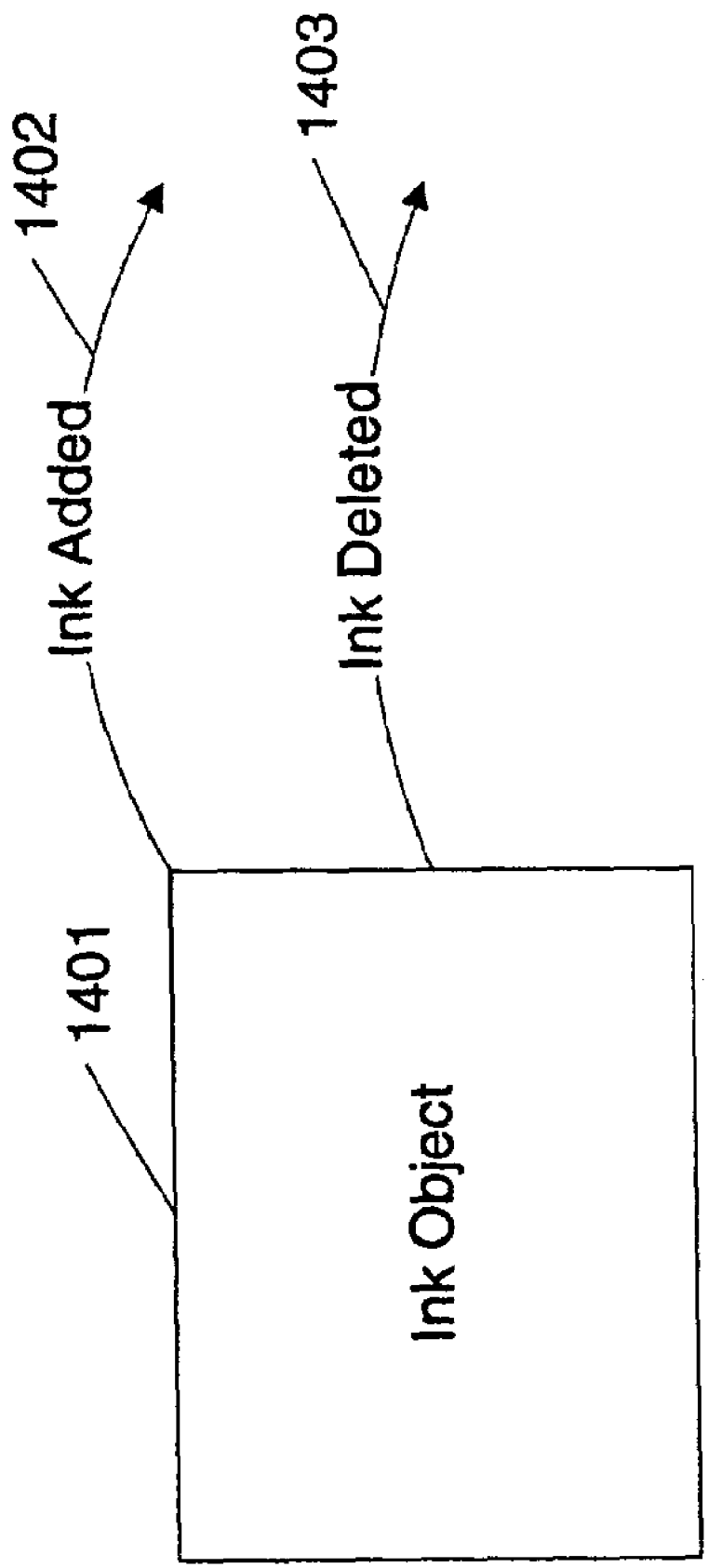
FIG. 14 shows an example of an ink object events in accordance with embodiments of the present invention.

Various events may be associated with the ink object as well. FIG. 14 shows various events occurring in relation to the ink object 1401. When strokes are added to the ink object 1401, the event 1402 is fired containing the identities of the strokes that were added. When strokes are deleted from the ink object, the event 1403 is fired containing the identities of the strokes that were deleted from the ink object 1401.

Figure 15:
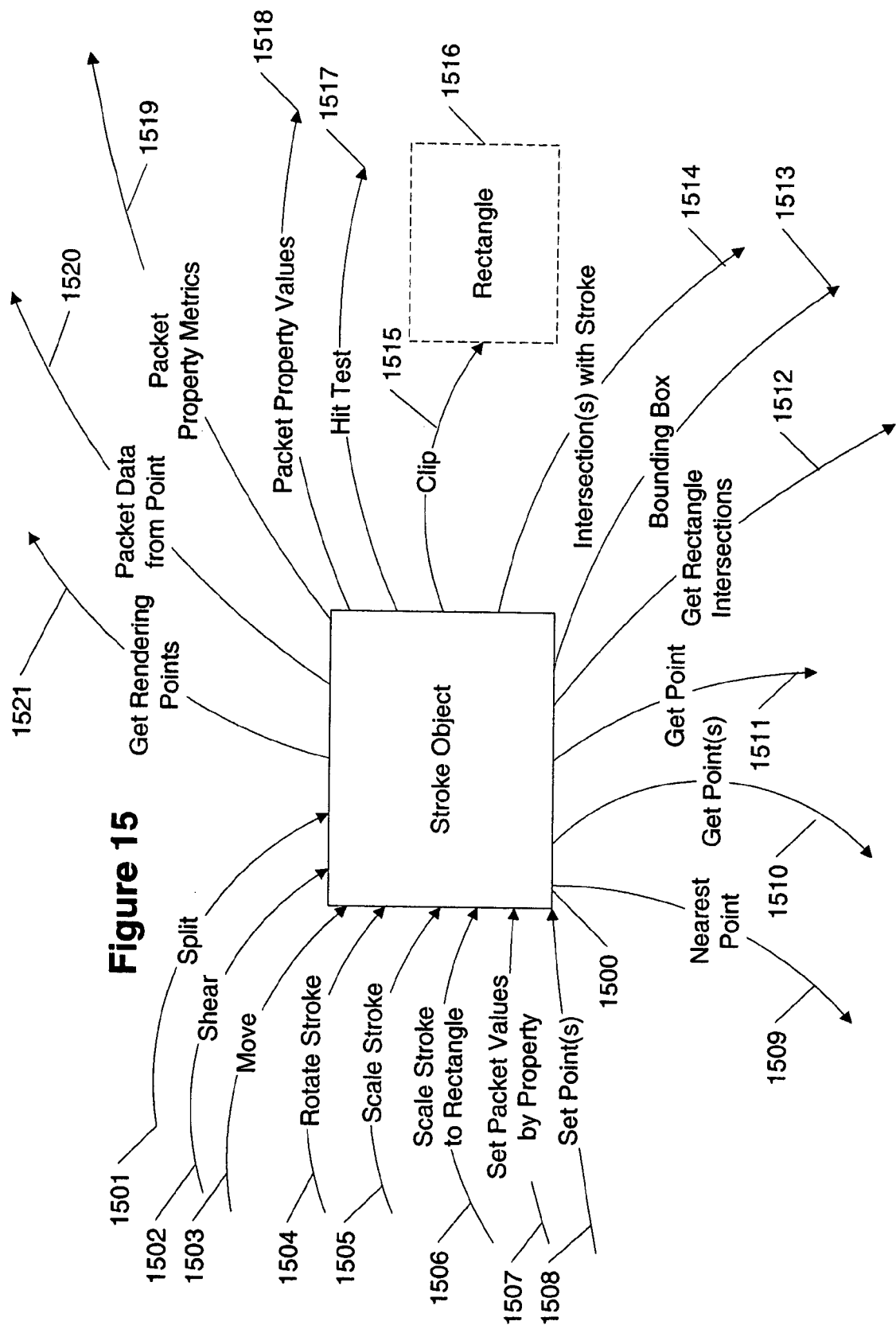
FIG. 15 shows an example of a stroke object in accordance with embodiments of the present invention.
Figure 16:
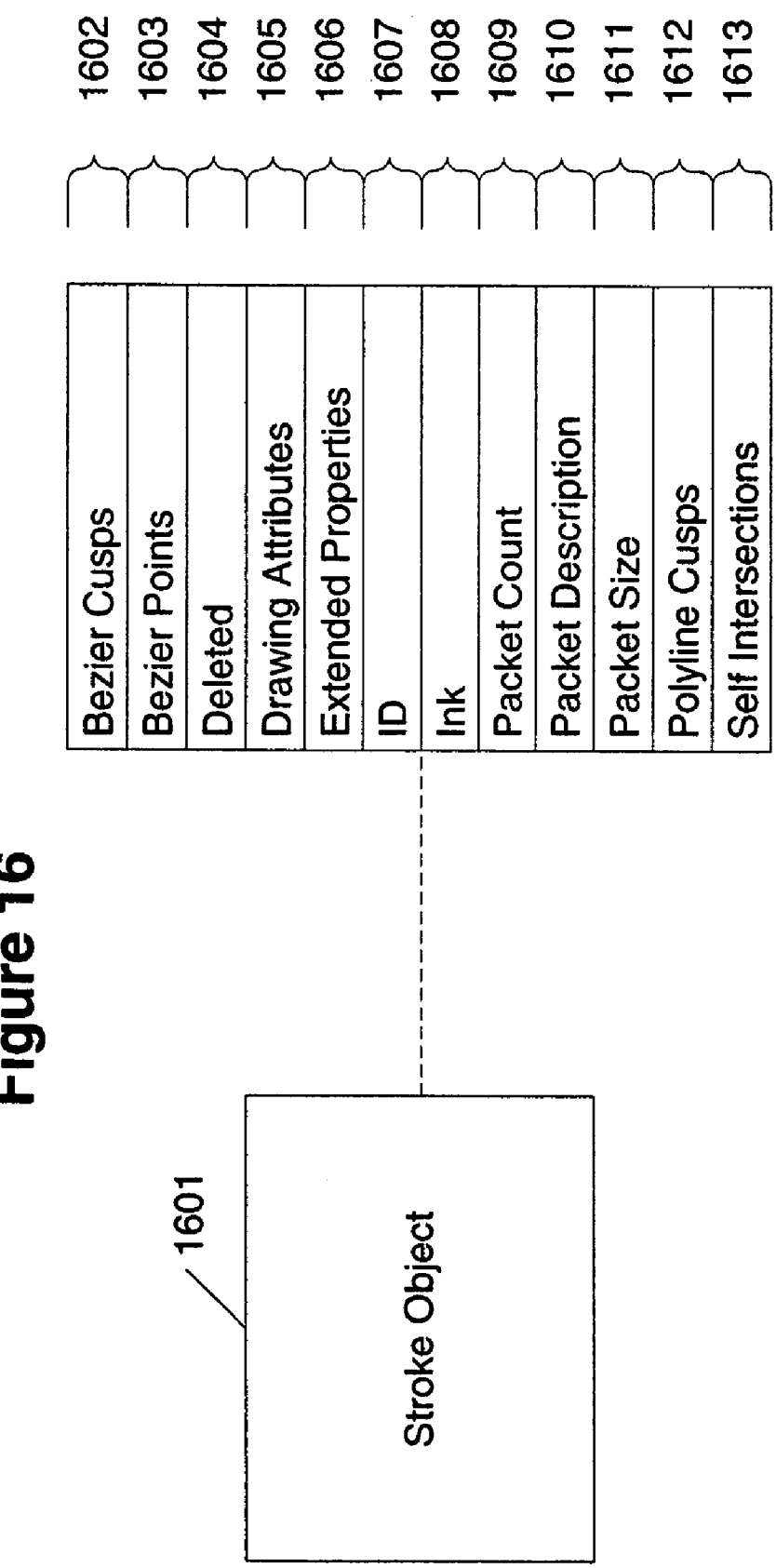
FIG. 16 shows an example of a stroke object with properties in accordance with embodiments of the present invention.

FIG. 15 shows a stroke object. The stroke object 1500 may exist as part of an ink object or exist separately. Various methods may be associated with the stroke objects. The methods may include methods 1501–1508 that modify the strokes or points of the strokes and methods 1509–1515 and 1517–1521 that obtain information regarding the stroke or strokes in the stroke object 1500. The various methods include splitting a stroke into two or more strokes (1501), shearing a stroke by horizontal and/or vertical factors (1502), moving or translating a stroke by a provided amount, distance, or vector (1503), rotating a stroke by a specified amount (1504), scaling a stroke (1505) by input factors (e.g., horizontal and vertical direction), scaling a stroke to fit within a provided rectangle (1506), setting (1507) the packet values for one or more properties of the stroke or strokes in the stroke object, and setting one or more points of a stroke to a new position (1508).

The methods that may be associated with a stroke object that obtain information, export, or derive information from the stroke object include obtaining a nearest point on a stroke or strokes in the stroke object to a provided point (1509), obtaining or getting a point or points on a stroke based on a provided index (e.g., a ratio or percentage along a stroke) (1510 and 1511), obtaining or getting intersections between the stroke or strokes of the stroke object 1500 and a provided shape (e.g. a rectangle) (1512). Other methods may include getting the bounding box for the stroke or strokes in the stroke object (1513), finding the intersection or intersections of the stroke or strokes in the stroke object with a provided stroke (1514), obtaining rendering points that are used to render the actual stroke or strokes (1521), obtaining packet data for specified point (1520), obtaining the property metrics for packet information (1519), obtaining the packet property values for all points in the stroke object (1518), and hit testing of the content of the stroke object with a provided shape (circle, rectangle, complex polygon, and the like) (1517). Finally, the stroke or strokes in the stroke object may be clipped (1515) to a provided rectangle 1516.

Various properties may be associated with the stroke object as well. The properties may include the approximation of the cusps of the strokes 1602. A cusp is a point on the stroke where the direction of writing changes in a discontinuous fashion. For example, if the stroke represents the capital letter "L", the property returns three cusps; two corresponding to the first and last control points on the stroke and the third representing the corner of the "L".

The properties may also include the points associated with the representation of the stroke as rendered (1603), the state of whether the stroke has been deleted from an ink object (1604), the drawing attributes of the stroke object (1605), any extended properties of the stroke object (1606), the identification of the stroke object (1607), the identification of the parent ink object (1608) (if the stroke object has a parent ink object), the packet count of the number of points in the stroke or strokes in the stroke object (1609), the packet description of any GUIDs (global unique identifiers associated with the properties of the stroke object) (1610), the packet size (1611), the actual cusps of the stroke or strokes in the stroke object (1612), and any intersections the stroke or strokes have with itself (1613). It is appreciate at these properties are not limiting. Other properties may be used as well.

Figure 17:
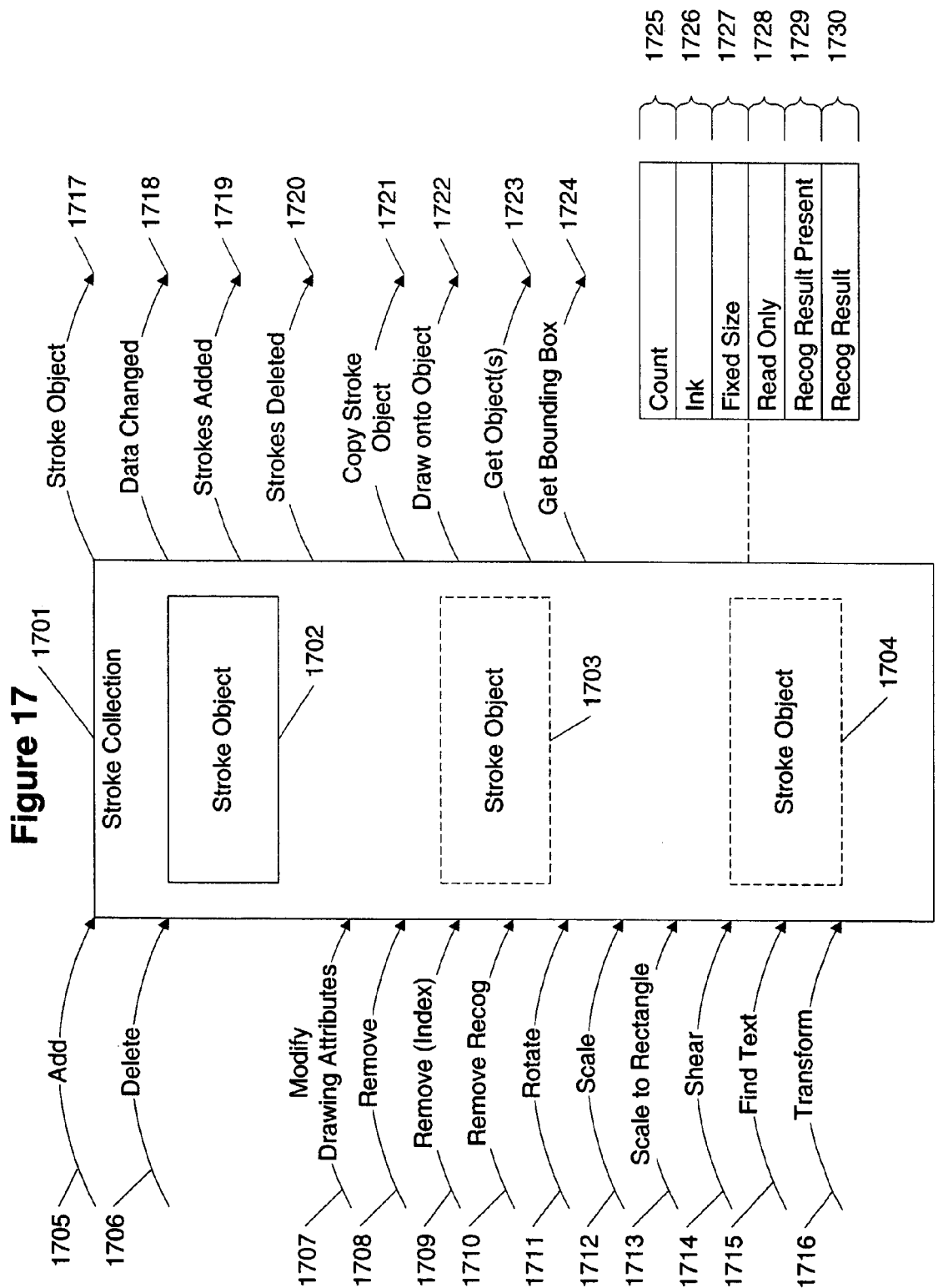
FIG. 17 shows an example of a stroke object collection in accordance with embodiments of the present invention.

The stroke object may form part of a stroke collection. FIG. 17 shows various methods, properties and events may be associated with the stroke collection 1701 having one or more stroke objects (1702–1704). The stroke collection relates to strokes from a single ink object. Using the stroke collection 1701 provides a simplified way of addressing all strokes in the ink object at the same time.

Strokes may be added (1705) or deleted (1706) from the stroke collection 1701. Here, one may specify the identity of the stroke object to be added or deleted from the stroke collection 1701.

Further, plural stroke collections may exist for each ink object. The stroke collections may be created or removed as needed (1708). As each ink object may have a variety of stroke collections, each stroke collection may have its own recognition result. For example, a first sentence (stored as a first stroke collection) may have an English recognizer associated with it, resulting in a recognition result of English words, while a second sentence (stored as a second stroke collection) may have a French recognizer associated with it, resulting in a recognition result of French words. Alternatively, a stroke collection may have multiple recognizers associated with it so that multiple recognition results may be provided for each language. In this latter example, a developer may recognize that a customer may write in either language. The developer would want to associative recognizers with the stroke collection to provide support for whichever language the customer uses. Referring to FIG. 17, this recognition result or results may be removed from the stroke collection (for example, if a new recognition result will be created or the current recognition result is incorrect). The text for the stroke collection may be extracted or the recognition result searched for specific text (1715), and returning the associated stroke or strokes identifiers.

The stroke collection 1701 may be rotated by a predefined amount (1711), scaled by X and Y coordinates or a vector (1712), scaled so as to fit in a provide rectangle or other shape (1713), and the strokes in the collection sheared by a specified amount (1714).

The various operations of scaling, rotation, translation, and skewing may be combined with a generic transform method (1716).

Information may be obtained from the stroke collection with methods 1717–1724. These methods may include obtaining a stroke object 1717, obtaining any changed data in the stroke object or stroke collection 1718, and providing the stroke objects that were added (1719) or deleted (1720). Further, the stroke object referenced by the collection may be copied to another collection (1720), the stroke object, objects, or collection may be drawn on to a graphics object (1722), a bounding box or other enclosing shape for the stroke collection may be obtained 1724, and specific stroke objects obtained 1723.

Various properties may be associated with the stroke collection 1701. The properties may include but are not limited to the count of stroke objects in the collection (1725), the ink object that contains the stroke collection (1726), an indication whether the stroke collection is of a fixed size (1727), an indication whether the stroke collection is read only (1728), an indication of whether a recognition result is present (1729), and finally the contents of the recognition result (1730).

Figure 18:
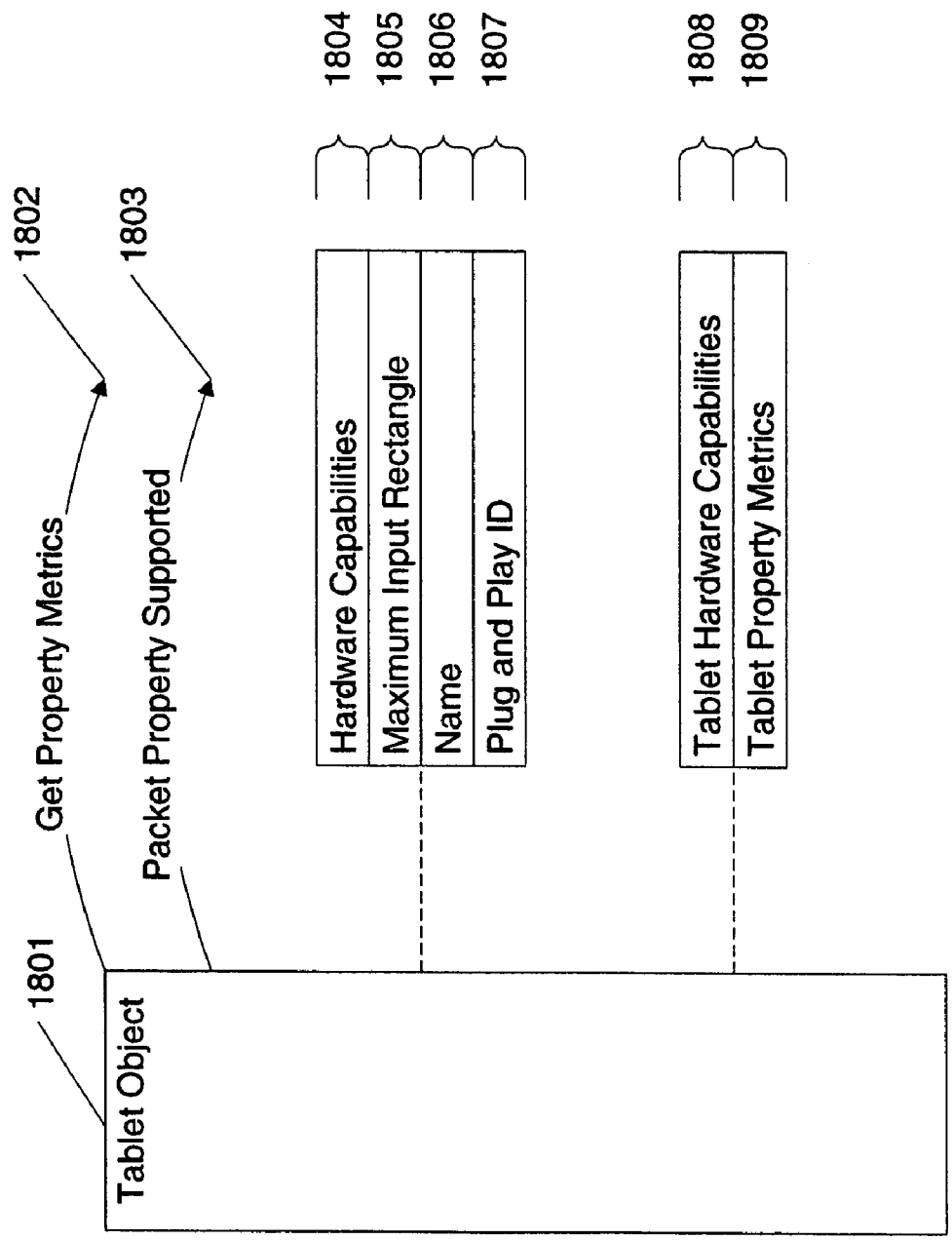
FIG. 18 shows an example of a tablet object in accordance with embodiments of the present invention.

Strokes may arise from a variety of sources. One of the sources includes the tablet of FIG. 2. The variety of vendors who provide or will provide tablets like that of FIG. 2 will likely vary in the properties of each tablet. Tablet object 1801 of FIG. 18 is provided to coordinate the input information into the tablet with the rest of the ink objects and related objects.

The tablet object 1801 may have properties associated with it. The methods may include the ability to obtain the property metrics of the tablet (1802) and whether or not various packet properties are supported by the tablet (1803) (for example, tilt angle of the stylus 166). Various properties may be specified in the tablet object as well including the hardware capabilities of the tablet (1804), the maximum physical input rectangle supported by the tablet (1805), the name of the tablet (1806), and the plug and play ID of the tablet (1807). The plug and play ID of the tablet 1807 permits automatic association of the tablet with the proper drivers controlling its interactions with the system.

The tablet object may include various enumerations include the tablet hardware capabilities (1808) and the tablet property metrics (1809).

Figure 19:
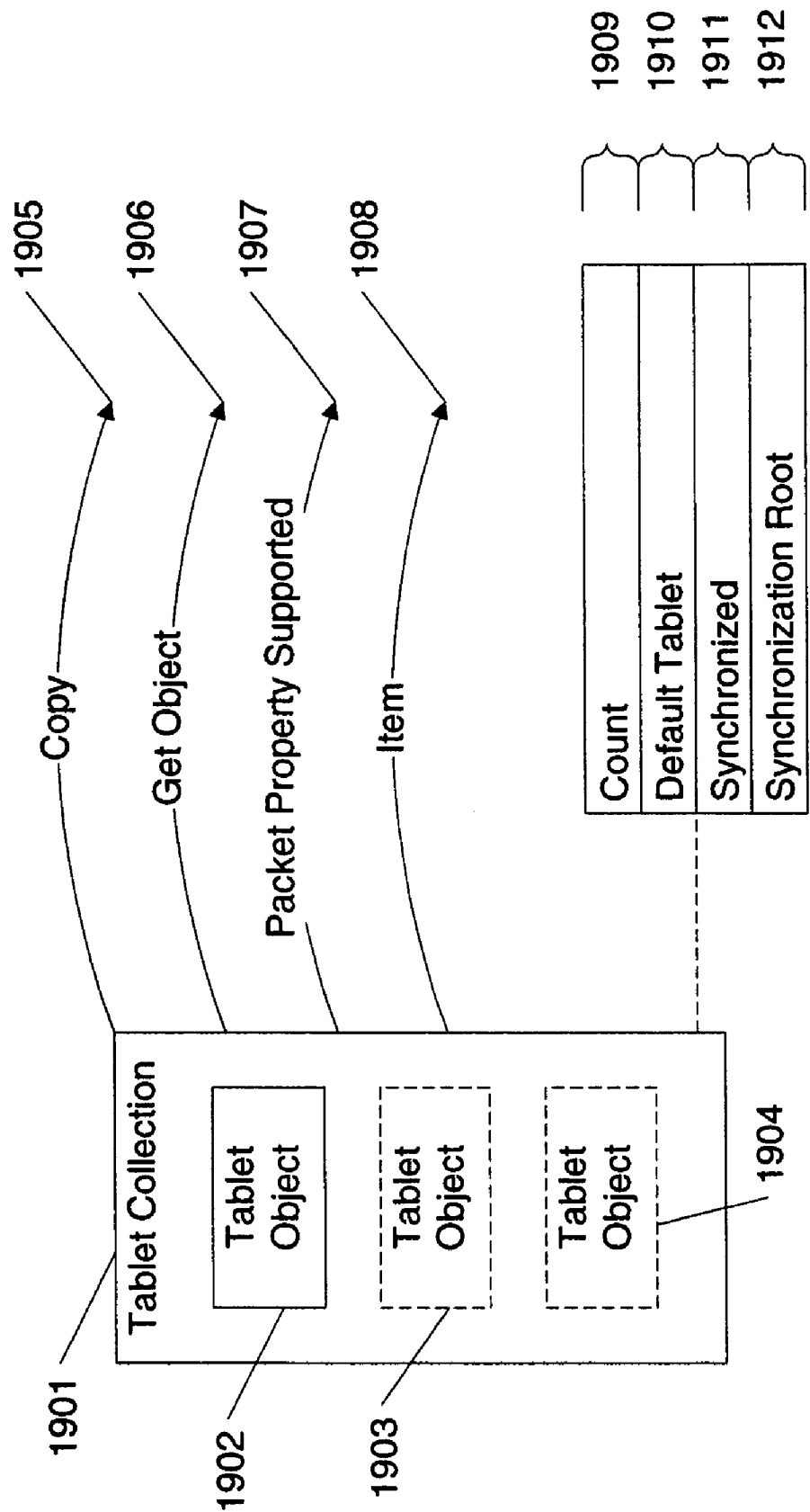
FIG. 19 shows an example of a tablet collection in accordance with embodiments of the present invention.

The tablet objects may be grouped together in one or more tablet collections. The tablet collection 1901 of FIG. 19 provides an example in which the table collection 1901 includes one or more tablet objects 1902–1904. Various methods may be associated with the tablet collection including copying one or more tablet objects to a new tablet collection (1905), obtaining one or more tablet objects (1906), determining whether a particular property is supported by all tablets in the collection (1907), and obtaining a particular item in the tablet collection (1908).

Various properties may be associated with each tablet collection 1901 including a count property 1909 that indicates the number of tablet objects in the collection, the default tablet property defines the default tablet in the collection 1901, the synchronized property which indicates access to the collection is synchronized, and the synchronized root property which provides an object to which access may be synchronized.

Figure 20:
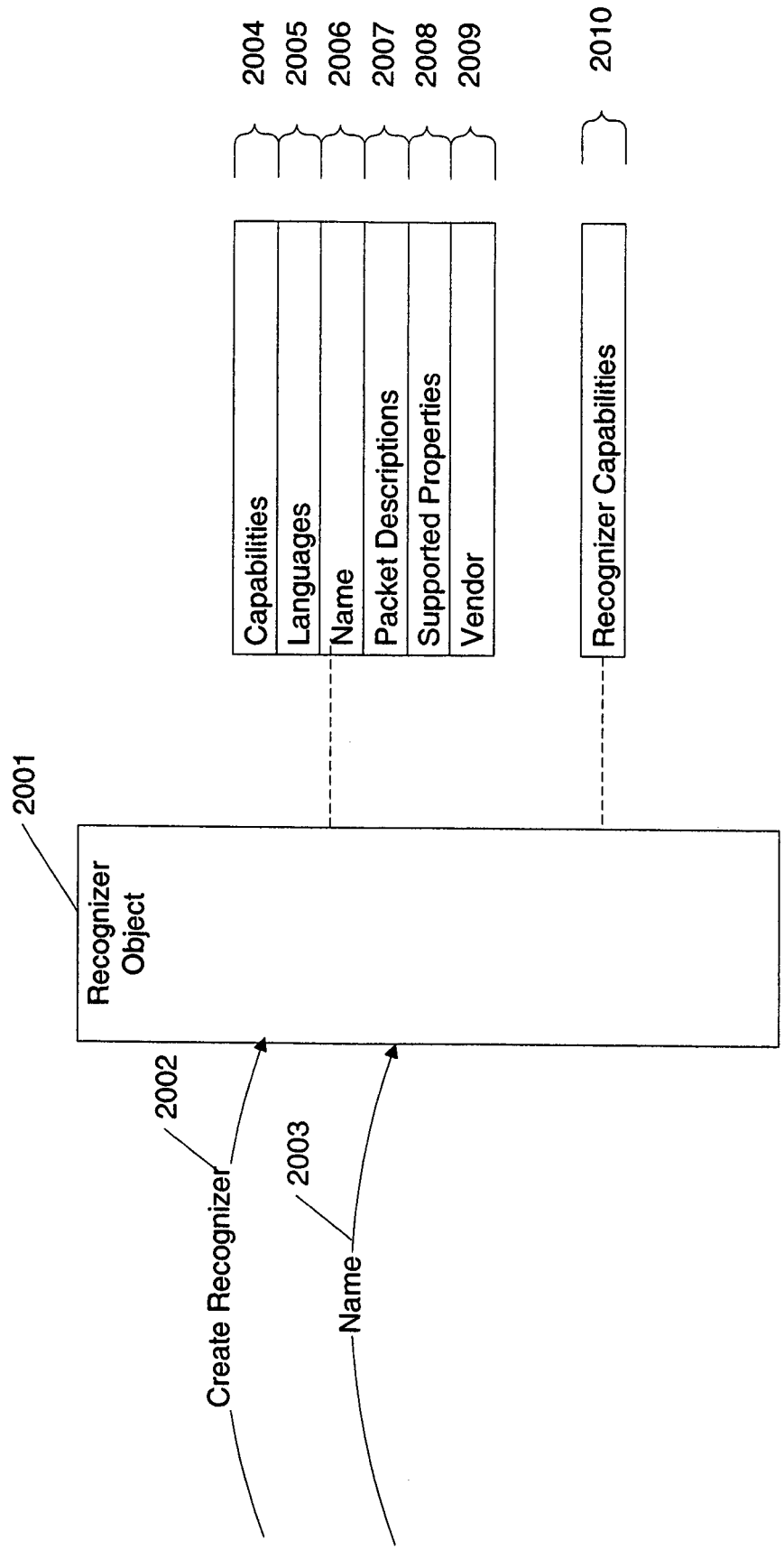
FIG. 20 shows an example of a recognizer object in accordance with embodiments of the present invention.

Strokes may be added to an ink object, a stroke object or the various collections. The ink object, stroke object or objects, or stroke collection may be associated with a recognizer object. The recognizer object represents the ability to process strokes and translate the strokes into text or gestures. The recognizer object is used to perform handwriting recognition. A sample recognizer object is shown in FIG. 20.

The recognizer may have a number of capabilities that may be specified in a property. For example, some recognizers may only recognize cursive writing, while others may recognize cursive and block printing. If a recognizer that does not support cursive handwriting is used to recognize cursive handwriting, it will likely return inaccurate results when a user writes in cursive.

A recognizer may have a variety of options. It may, for example, determine the metrics for the lines on which strokes are drawn. You can return the line number of a stroke, but you never need to specify how those line metrics are determined because of the built-in functionality of the recognizer.

The recognizer may have a variety of enumerations, including, for example, the capabilities of the recognizer. The recognizer may also have methods. Methods include creating (2002) a new recognizer context (FIG. 22) and specifying and/or retrieving the name of the recognizer (2003).

The recognizer object may have a number of properties associated with it. The properties may include the capabilities of the recognizer 2004 (for example, whether the recognizer supports character auto completion (CAC), or whether it supports free, lined, or boxed input), the list of languages or sub-language combinations supported by the recognizer (2005), the name of the recognizer (2006), the preferred packet description of the recognizer (may include a list of globally unique identifiers (GUIDs)) (2007), the list of properties supported by the recognizer (2008), and the vendor of the recognizer (2009).

Figure 21:
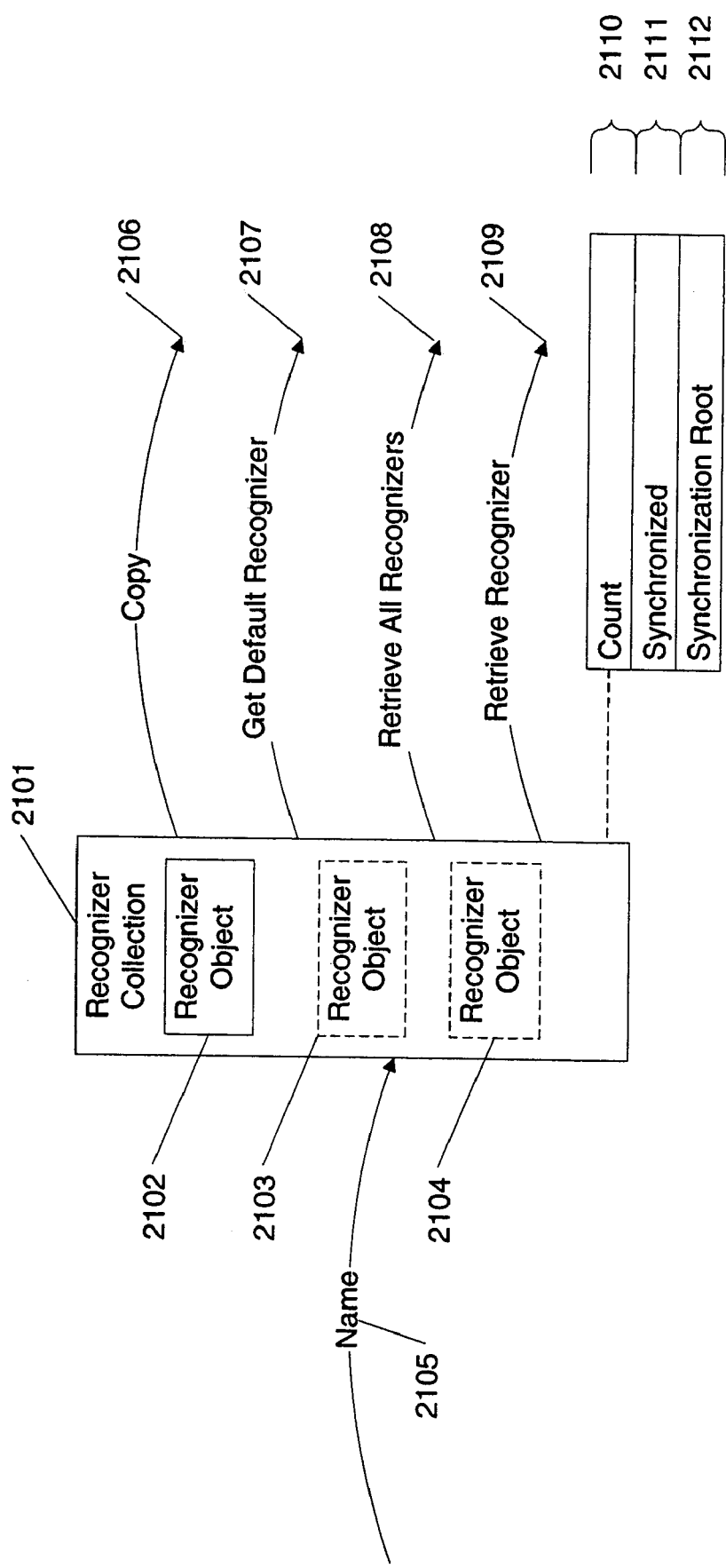
FIG. 21 shows an example of a recognizer collection in accordance with embodiments of the present invention.

The recognizer object 2001 may be combined with other recognizers in a recognizer collection 2101 as shown for instance in FIG. 21. FIG. 21 shows the recognizer collection 2101 with one or more recognizer objects 2102–2104. Various methods and properties may be associated with the recognizer collection. For example, the recognizer collection may be named (2105), the collection copied to another collection (2106), a default recognizer specified and retrieved (2107), all recognizers retrieved (2108), and a specific recognizer retrieved (2109). Various properties may be associated with the recognizer collection as well including a count of all the recognizers in the collection (2110) and synchronization information (whether the collection is synchronized 2111 and an object that may be used to synchronize the collection 2112).

Figure 22:
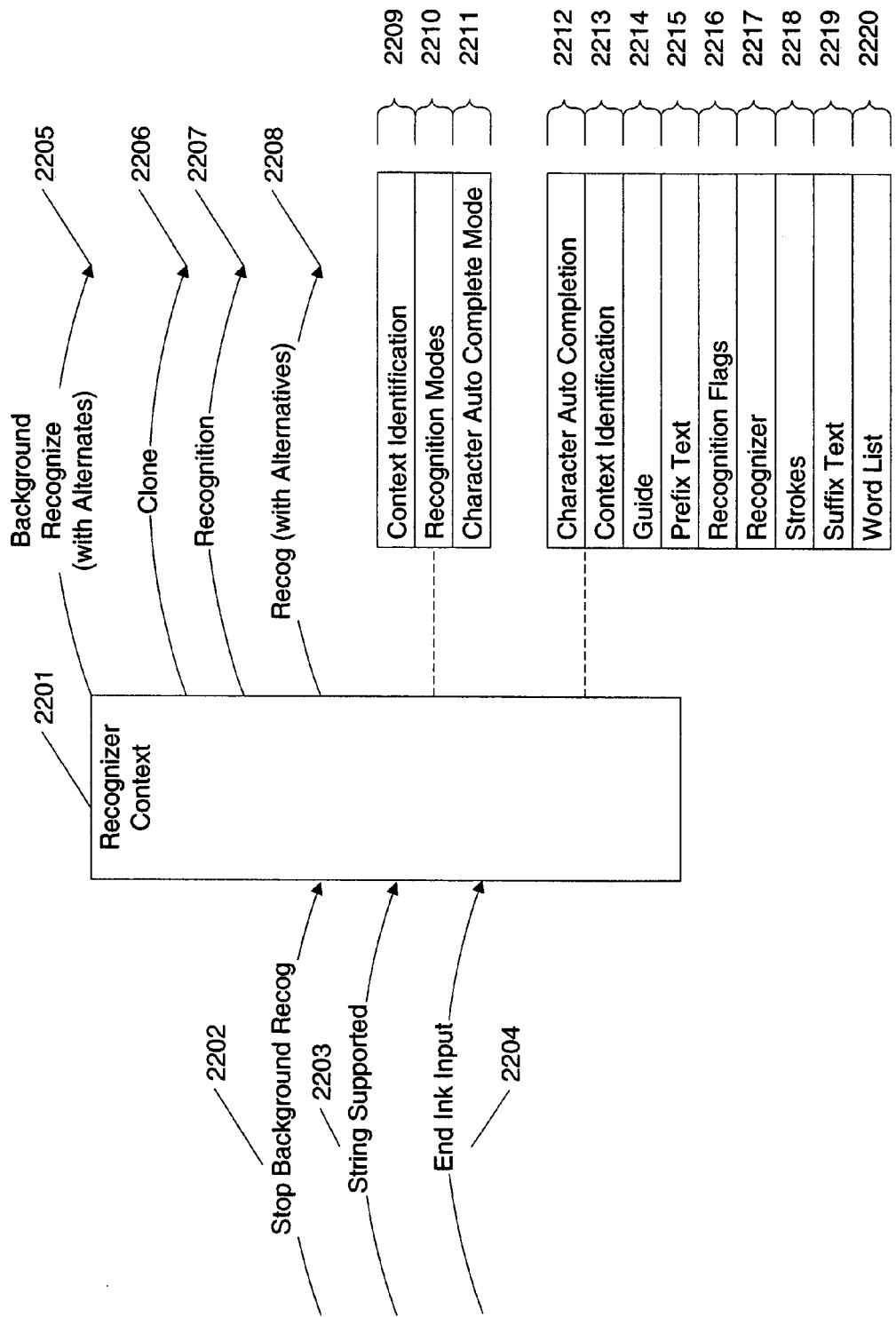
FIG. 22 shows an example of a recognizer context in accordance with embodiments of the present invention.

The recognizer context object shown in FIG. 22 represents the ability to perform ink recognition, retrieve the recognition result, and retrieve alternates. The recognizer context object 2201 enables the various recognizers installed on a system to process input appropriately by performing ink recognition. At least two types of recognition may be performed including background recognition or foreground recognition. Background recognition occurs in the background processing of the system and may be stopped due to other system events (created by the user or otherwise). In contrast, foreground recognition is generally initiated by a user and does not stop until the recognition is completed.

The recognition context object supports recognition. It may receive ink strokes that need to be recognized and defines the constraints or other parameters on the input ink and the desired recognition output. For example, constraints that may be set include the language, dictionary, and grammar to be used during recognition. A recognizer context may be set for each data entry field a form. The different data entry fields may be specific to certain sets of information: telephone number fields having numbers, plus signs, dashes and parentheses; zip code fields having numbers and dashes only; state abbreviations having capital letters only; and the like.

Enumerations may be set of the context of the recognition field 2209, the various recognition modes 2210, and any character auto completion 2211. Various recognition events may also occur. A recognition event 2207 may occur when a recognition result is received from a recognizer. This result may be a top recognition result 2207 only or may include alternates 2208.

Various methods may be associated with the recognition context as well. The various methods include background recognize (2205) (where the recognizer is instructed to asynchronously recognize associated strokes and fire a recognition event when recognition is complete). This may include requesting alternatives to be returned as well. Another method may include the clone method (2206) in which a copy of an original is created. Another method includes specifying that no more ink is being added to the context (end ink input 2204) and determining if a string is supported (2203) by for example, a system dictionary a user dictionary, a word list or the like. The recognize method 2207 provides a list a strokes to be recognized to a recognizer and returns the results. Finally, background recognition may be stopped in method 2202.

Various properties may be specified as well including an indication of the character auto completion mode that indicates whether characters or words are to be recognized (2212), the identification of the context of the strokes (for example, a zip code field, an address field, a name field, a file name field, and the like (also factoid) (2213), a guide 2214 that may be used for recognition (a box into which the user is supposed to write), prefix and suffix text (2215 and 2219) that may be used as a guide to assist the recognition results, recognition flags 2216 that returns or sets the case that should be returned from the recognizer context, such as whether the recognizer treats all ink as a single word, or whether it coerces the result based on the context identification 2213 specified for the context, the strokes 2218 that are associated with the recognizer context 2201, and a word list 2220 which include words that may be used to improve recognition. As to guide 2214, knowing where to recognize by forcing a user to write in a guide area may improve recognition.

Figure 23:
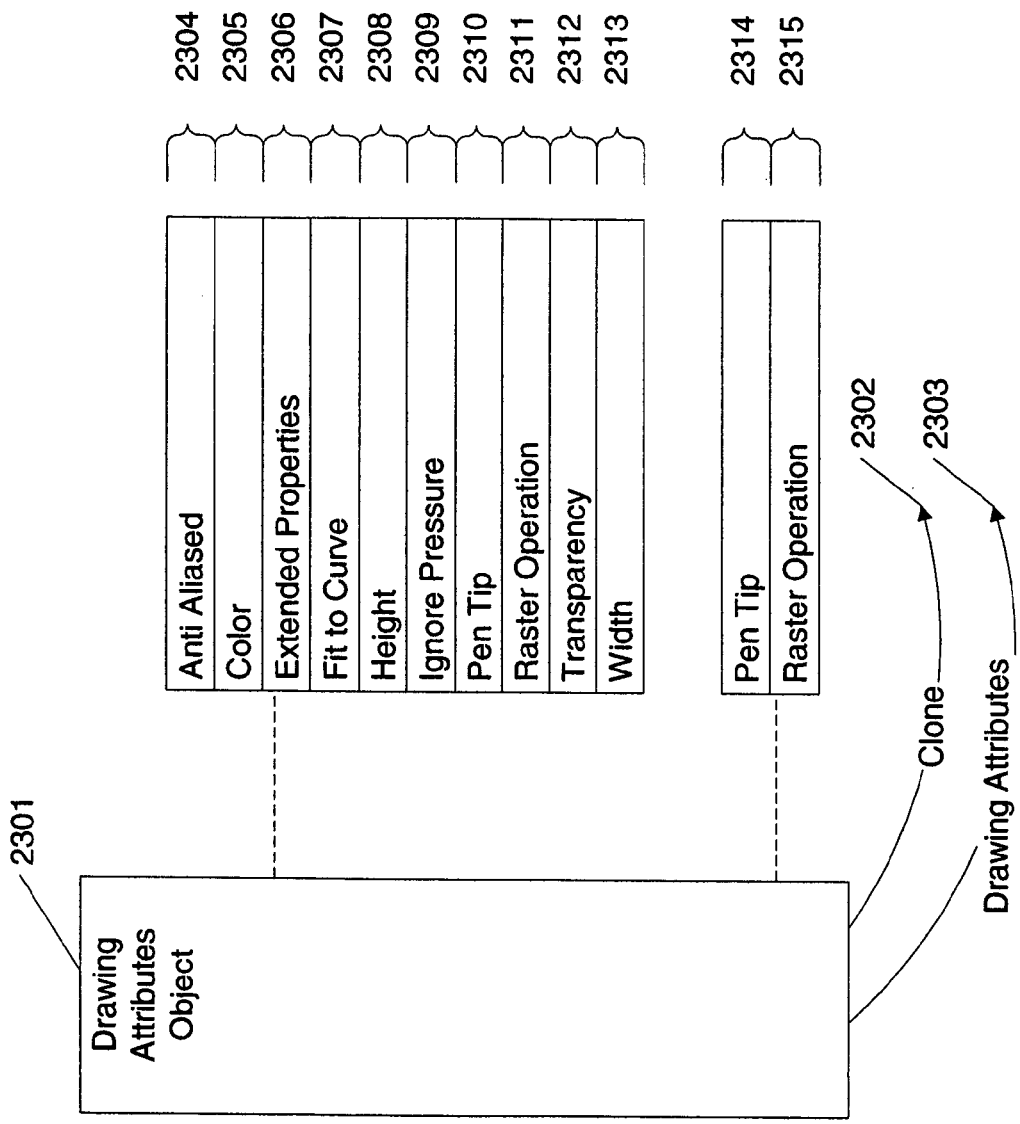
FIG. 23 shows an example of a drawing attributes object in accordance with embodiments of the present invention.
Figure 24:
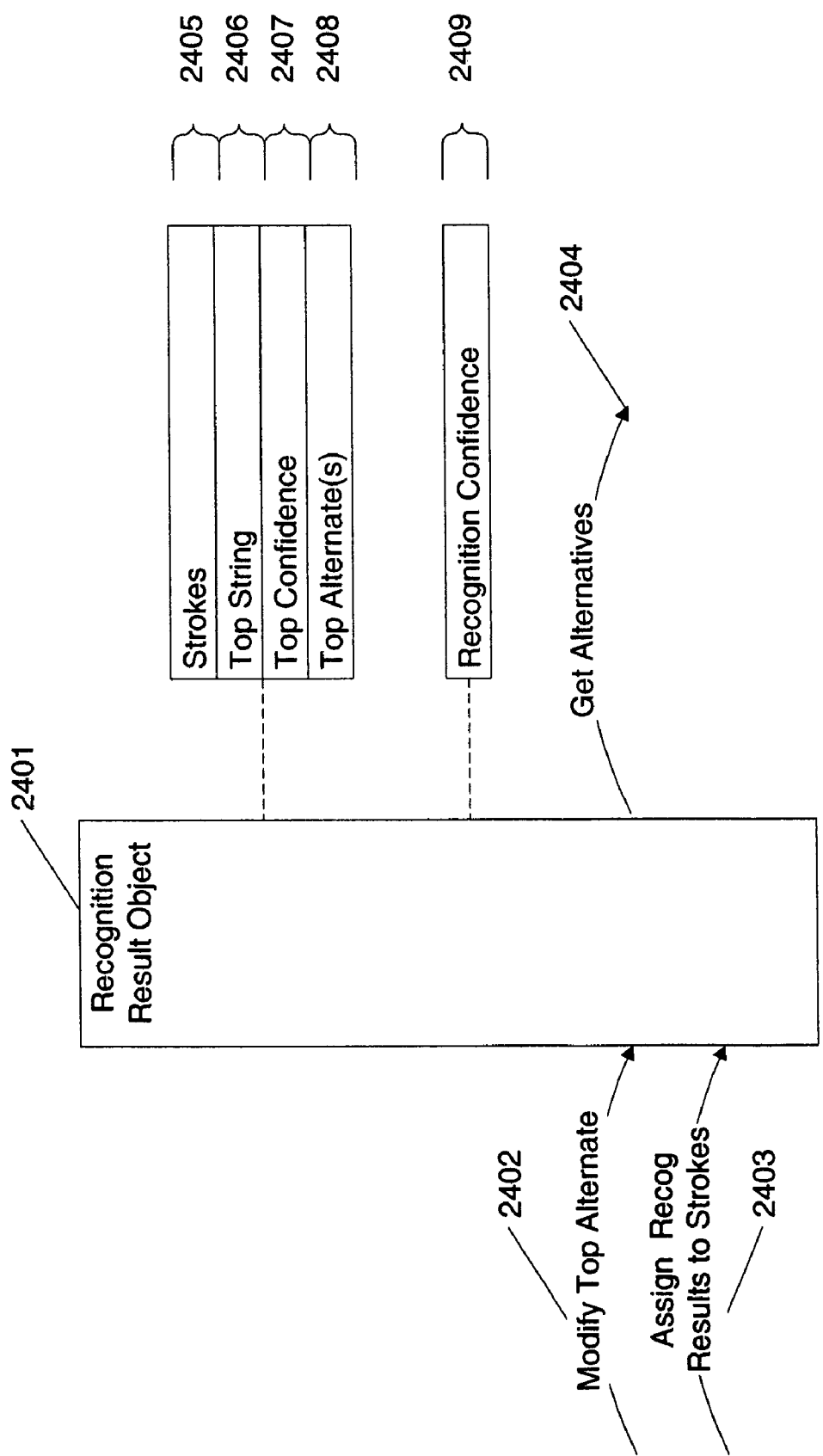
FIG. 24 shows an example of a recognition results object in accordance with embodiments of the present invention.

Various other components may be included including a recognizer guide to help the recognition process, a drawing attributes object (for example, which stores various drawing attributes with properties, methods, and enumerations) as shown in FIG. 23 and a recognizer result object as shown in FIG. 24.

Figures 25A, 25B:
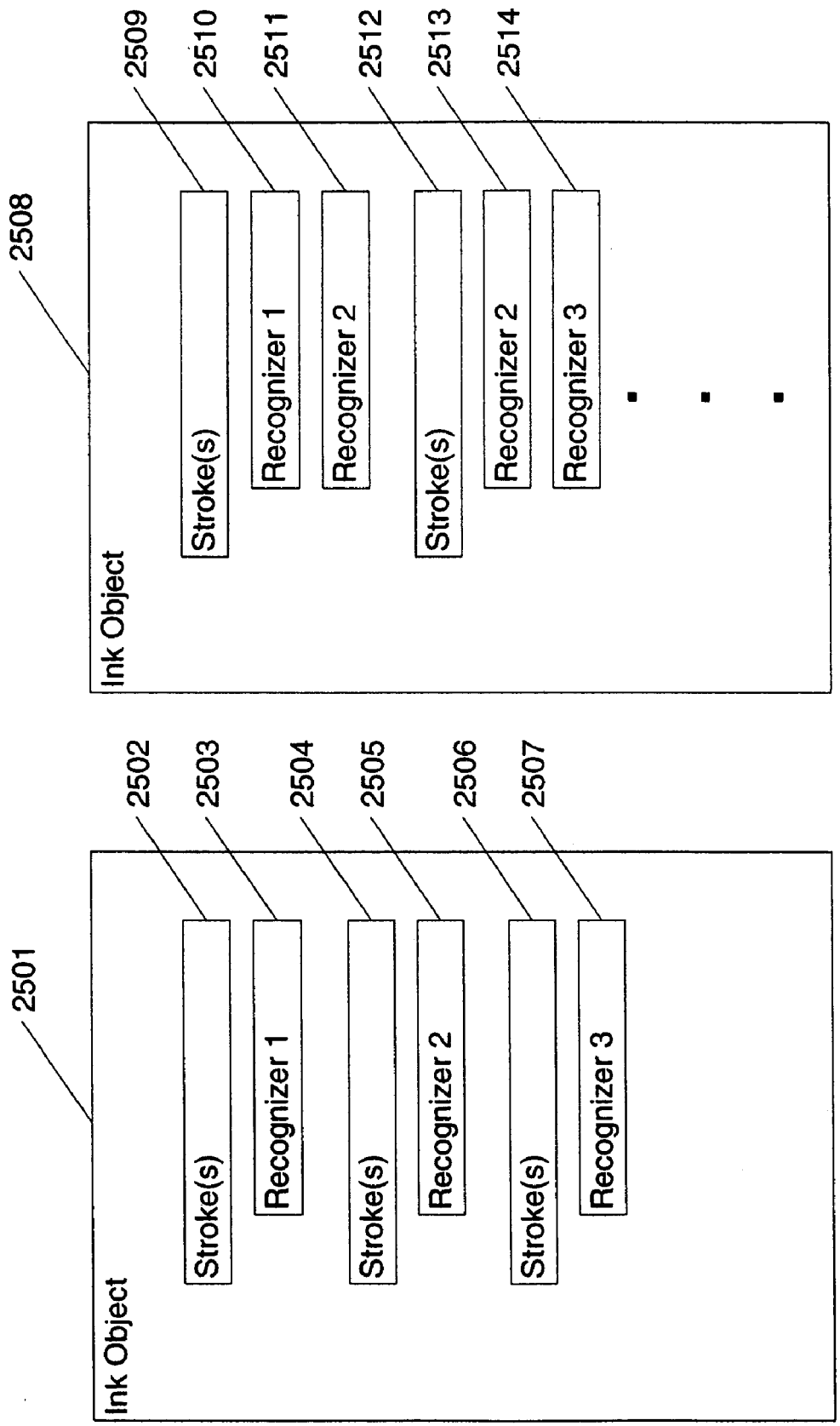
FIGS. 25A and 25B show various samples of ink objects and associated recognizers in accordance with embodiments of the present invention.

FIGS. 25A and 25B shows ink objects with various associations between the strokes and recognizers. In FIG. 25A, each set of strokes has an association with one recognizer. In FIG. 25B, each set of strokes has an association with one or more recognizers.

A Summarization of the Storage of Ink

Ink may be stored in an ink object with the ink object providing coordinate data and/or other properties associated with strokes. Compression may be used to increase the efficiency at which the ink may be stored.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

What is claimed is:

1. A method of receiving information regarding a recognizer, comprising the steps of:
   sending a request for information to a recognizer object; and
   receiving from said recognizer object information regarding said recognizer,
   wherein the information regarding said recognizer includes a list of a plurality of properties supported by said recognizer.

2. The method of receiving information from said recognizer according to claim 1, wherein properties include capabilities of said recognizer.

3. The method of receiving information from said recognizer according to claim 1, wherein the information regarding said recognizer includes a list of a plurality of languages recognized by said recognizer.

4. The method of receiving information from said recognizer according to claim 1, wherein the information regarding said recognizer includes a name of said recognizer.

5. The method of receiving information from said recognizer according to claim 1, wherein said information regarding said recognizer object includes an identification of a recognizer collection of which said recognizer object is a member.

6. The method of claim 1, wherein the information regarding said recognizer includes a list of a plurality of languages recognized by said recognizer.

7. The method of claim 1, wherein the information regarding said recognizer includes a name of said recognizer.

8. The method of claim 1, wherein said information regarding said recognizer object includes an identification of a recognizer collection of which said recognizer object is a member.

9. A method of providing information regarding a recognizer, comprising the steps of:
   a recognizer object receiving a request for information; and
   said recognizer object returning information regarding said recognizer,
   wherein the information regarding said recognizer includes a list of a plurality of properties supported by said recognizer.

10. The method of claim 9, wherein the properties include capabilities of said recognizer.

* * * * *